US011223797B2

(12) United States Patent
Yamamoto

(10) Patent No.: US 11,223,797 B2
(45) Date of Patent: Jan. 11, 2022

(54) VIDEO DEVICE AND CONNECTION DETERMINATION METHOD

(71) Applicant: NEC Display Solutions, Ltd., Tokyo (JP)

(72) Inventor: Nobutaka Yamamoto, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/643,396

(22) PCT Filed: Sep. 6, 2017

(86) PCT No.: PCT/JP2017/032065
§ 371 (c)(1),
(2) Date: Feb. 28, 2020

(87) PCT Pub. No.: WO2019/049232
PCT Pub. Date: Mar. 14, 2019

(65) Prior Publication Data
US 2020/0413005 A1  Dec. 31, 2020

(51) Int. Cl.
H04N 17/00 (2006.01)
H04N 7/10 (2006.01)

(52) U.S. Cl.
CPC ............. *H04N 7/104* (2013.01); *H04N 17/00* (2013.01)

(58) Field of Classification Search
CPC ...... H04N 21/436; H04N 7/104; H04N 17/00; H04N 21/4122; H04N 21/43632; G09F 9/00
See application file for complete search history.

(56) References Cited

U.S. PATENT DOCUMENTS 9,977,286 B2 * 5/2018 Kimura ................. G02F 1/1368
2004/0196272 A1 * 10/2004 Yamashita ............ G09G 3/3688
345/204

(Continued)

FOREIGN PATENT DOCUMENTS

CN   102739231 A   10/2012
JP   2009-130680 A  6/2009
(Continued)

OTHER PUBLICATIONS

International Search Report (ISR) (PCT Form PCT/ISA/210), in PCT/JP2017/632065, dated Nov. 21, 2017.
(Continued)

*Primary Examiner* — Paulos M Natnael
(74) *Attorney, Agent, or Firm* — McGinn IP Law Group, PLLC

(57) ABSTRACT

A video device includes at least one of an input connector and an output connector connectible with a video-signal cable, wherein the input connector is connected to a first resistor coupled with a predetermined potential and oppositely connected to a first signal line of the video-signal cable connected to a second resistor of a second video device, and wherein the output connector is connected to a third resistor coupled with a ground potential and oppositely connected to a second signal line of the video-signal cable connected to a fourth resistor of a third video device; and a connection determination part configured to determine a normal connection of the video-signal cable connected to the input connector based on a potential of the first signal line or to determine a normal connection of the video-signal cable connected to the output connector based on a potential of the second signal line.

15 Claims, 15 Drawing Sheets

(56) References Cited

U.S. PATENT DOCUMENTS

| | | | |
|---|---|---|---|
| 2005/0212978 A1* | 9/2005 | Lo | ............................ H04N 5/63 |
| | | | 348/731 |
| 2017/0343874 A1* | 11/2017 | Kimura | ................ G09G 3/3659 |
| 2018/0041240 A1* | 2/2018 | Tsuchiya | ............. H04L 25/0272 |

FOREIGN PATENT DOCUMENTS

| | | |
|---|---|---|
| JP | 2014-165738 A | 9/2014 |
| JP | 2017-041704 A | 2/2017 |

OTHER PUBLICATIONS

Chinese Office Action, dated Aug. 5, 2021, in Chinese Application No. 201780094254.6 and English Translation thereof.

* cited by examiner

FIG. 13

| DETERMINATION | | CASE | VIDEO DEVICE 101 | | | VIDEO DEVICE 102 | | | |
|---|---|---|---|---|---|---|---|---|---|
| VIDEO DEVICE 101 DETERMINATION RESULT | VIDEO DEVICE 102 DETERMINATION RESULT | | CABLE CONNECTION CONNECTOR | VOLTAGE AT TERMINAL 111 | VOLTAGE AT TERMINAL 112 | CABLE CONNECTION CONNECTOR | VOLTAGE AT TERMINAL 111 | VOLTAGE AT TERMINAL 112 | MAIN POWER SOURCE |
| NORMAL | NORMAL | (1) | OUTPUT | 300mV | 3.3V | INPUT | 0V | 300mV | ON |
| ERROR | ERROR | (2) | OUTPUT | 0V | 3.3V | OUTPUT | 0V | 3.3V | ON |
| ERROR | ERROR | (3) | INPUT | 0V | 3.3V | INPUT | 0V | 3.3V | ON |
| ERROR | ERROR | (4) | OUTPUT | 0V | 3.3V | OUTPUT | | | OFF |
| ERROR | ERROR | (5) | OUTPUT | 0V | 3.3V | INPUT | | | OFF |
| ERROR | ERROR | (6) | INPUT | 0V | 3.3V | OUTPUT | | | OFF |
| ERROR | ERROR | (7) | INPUT | 0V | 3.3V | INPUT | | | OFF |
| ERROR | ERROR | (8) | INPUT | 0V | 3.3V | UNCONNECTED | | | |
| ERROR | ERROR | (9) | OUTPUT | 0V | 3.3V | UNCONNECTED | | | |
| NORMAL | NORMAL | (10) | INPUT | 0V | 300mV | OUTPUT | 300mV | 3.3V | ON |

ND CONNECTION
VIDEO DEVICE AND CONNECTION DETERMINATION METHOD

TECHNICAL FIELD

The present invention relates to a video device and a connection determination method.

BACKGROUND ART

According to the DisplayPort (indicating display ports) (i.e. a trademark or a registered trademark in the U.S. and other countries) (hereinafter, simply referred to as DP), i.e. one standard for interfacing with video signals, it is possible to connect a plurality of video devices in a daisy-chain manner. For this reason, a single video device may have an input DP connector and an output DP connector. According to the DP, the input DP connector and the output DP connector have the same shape. When connecting a plurality of video devices using video-signal cables (or DP cables), users may suffer from a failure to connect video-signal cables to wrong DP connectors by mistake. Properly, a user should connect an input DP connector to an output DP connector using a video-signal cable, whereas a user may cause an error connection such that output DP connectors may be mistakenly connected together or input DP connectors may be mistakenly connected together.

Patent Document 1 discloses an electronic device configured to determine the aforementioned error connection. The electronic device disclosed in Patent Document 1 is designed to detect the existence/nonexistence of an error connection based on a combination of a signal level of a HDP signal (i.e. a Hot Plug/Unplug Detect signal) according to the DP and the content of a communication on an AUX channel (i.e. an Auxiliary channel). The electronic device disclosed in Patent Document 1 suffers from a problem in that it may take a certain time due to a process to confirm the content of a communication when detecting the existence/nonexistence of an error connection.

Patent Document 2 teaches a single constitutional element involved in the embodiment of the present invention. To connect both a pullup resistor and a pulldown resistor to a signal line, Patent Document 2 shows a configuration using switches to be connected to the pullup resistor and the pulldown resistor in series. The configuration shown in Patent Document 2 provides those switches to suppress consumption of currents flowing through series circuits for connecting the pullup resistor and the pulldown resistor in series.

CITATION LIST

Patent Document

Patent Document 1: Japanese Patent Application Publication No. 2014-165738
Patent Document 2: Japanese Patent Application Publication No. 2017-41704

SUMMARY OF INVENTION

Technical Problem

The present invention is made in consideration of the aforementioned circumstances, and therefore the present invention aims to provide a video device and a connection determination method which can determine the existence/nonexistence of an error connection using a video-signal cable with a simple configuration.

Solution to Problem

In one aspect of the present invention, a video device includes at least one of an input connector coupled with a video-signal cable configured to transmit a video signal and an output connector coupled with the video-signal cable, wherein a first resistor is provided in connection with the input connector while a third resistor is provided in connection with the output connector, wherein when the input connector is provided and normally connected to other video device through the video-signal cable, a first signal line, corresponding to one of a plurality of signal lines connected to the input connector, is connected to a first potential via a second resistor and a first switch included in the other video device in which the first switch is closed upon turning on a main power source of the other video device, wherein the first signal line is further connected to a second potential different from the first potential via the first resistor, and wherein when the output connector is provided and normally connected to the other video device through the video-signal cable, a second signal line, corresponding to one of a plurality of signal lines connected to the output connector, is connected to a third potential via a fourth resistor and a second switch included in the other video device in which the second switch is closed upon turning on the main power source of the other video device, wherein the second signal line is further connected to a fourth potential different from the third potential via the third resistor; and a connection determination part configured to determine whether or not the video-signal cable is connected normally based on a potential of the first signal line or a potential of the second signal line.

In one aspect of the present invention, a video device includes an input connector and an output connector connectible to a video-signal cable and further includes a first switch and a second switch which are each closed upon turning on a main power source of the video device; a first signal line which is connected to a first terminal of the input connector and which is connected to one contact of the first switch via a first resistor; a first-potential signal line connected to other contact of the first switch; a second signal line which is connected to a second terminal of the output connector and which is connected to one contact of the second switch via a second resistor; a second-potential signal line connected to other contact of the second switch; and a connection determination part configured to determine whether or not the video-signal cable is normally connected to the input connector based on a potential of the first signal line and configured to determine whether or not the video-signal cable is normally connected to the output connector based on a potential of the second signal line.

In one aspect of the present invention, a connection determination method is provided for a video device including an input connector and an output connector connectible to a video-signal cable. The connection determination method includes the steps of: closing a first switch, which is connected to a first signal line coupled with a first terminal of the input connector via a first resistor and further connected to a first-potential signal line, upon turning on a main power source of the video device; closing a second switch, which is connected to a second signal line coupled with a second terminal of the output connector via a second resistor and further connected to a second-potential signal line, upon turning on the main power source of the video device;

determining whether or not the video-signal cable is normally connected to the input connector based on a potential of the first signal line; and determining whether or not the video-signal cable is normally connected to the output connector based on a potential of the second signal line.

Advantageous Effects of Invention

According to the present invention, it is possible to determine the existence/nonexistence of an error connection using a video-signal cable with a simple configuration.

BRIEF DESCRIPTION OF DRAWINGS

FIG. 13 shows a table collectively showing operation examples of the video device 101 shown in FIG. 3.

DESCRIPTION OF EMBODIMENT

Figure 1:
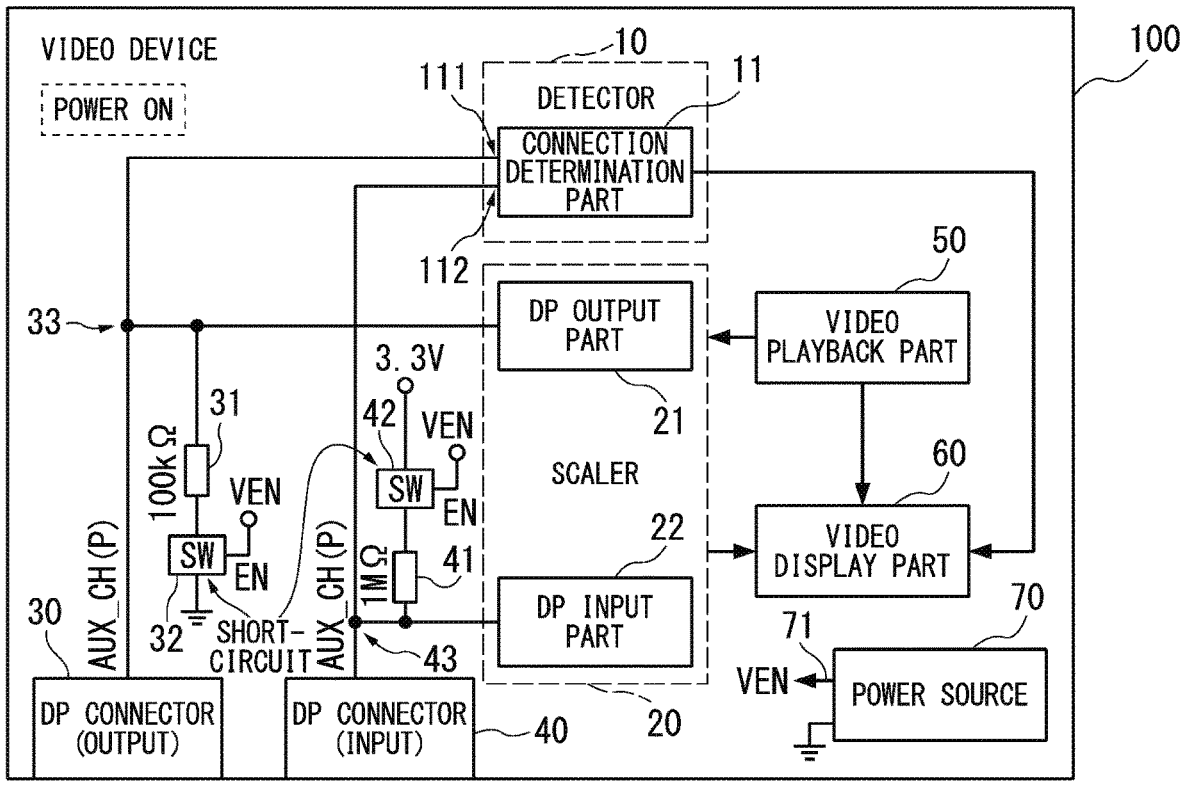
FIG. 1 is a block diagram showing a configuration example of a video device according to one embodiment of the present invention.

Hereinafter, the present invention will be described by way of the embodiment with reference to the drawings. FIG. 1 is a block diagram showing a configuration example of a video device according to one embodiment of the present invention. FIG. 1 shows a video device 100 including a detector 10, a scaler 20, a DP connector 30, a pulldown resistor 31, a switch 32, a DP connector 40, a pullup resistor 41, a switch 42, a video playback part 50, a video display part 60, and a power source 70.

The detector 10 further includes a connection determination part 11. For example, the connection determination part 11 can be realized by an electronic circuit or hardware such as electronic circuit or by a combination of hardware such as a CPU (Central Processing Unit) and software (i.e. programs) executed by the CPU. The connection determination part 11 has an input terminal 111 and an input terminal 112. The input terminal 111 is connected to a signal line 33. The signal line 33 is connected to an AUX_CH (P) pin, i.e. one of multiple pins (or terminals) of the DP connector 30. The input terminal 112 is connected to a signal line 43. The signal line 43 is connected to an AUX_CH (P) pin, i.e. one of multiple pins of the DP connector 40. For example, the connection determination part 11 may determine whether or not a video-signal cable and another video device 100 are normally connected to the DP connector 30 based on a potential of the input terminal 111. In addition, the connection determination part 11 may determine whether or not a video-signal cable and another video device 100 are normally connected to the DP connector 40 based on a potential of the input terminal 112. The connection determination part 11 makes an error notification in such a way that the video display part 60 may display the information representing the determination result (e.g. the information indicating the occurrence of an error connection upon detecting an error connection), a predetermined display light may be turned on or flashed, a notification sound may be outputted.

In the present embodiment, an error connection indicates that the video device 100 configured to determine a correct/incorrect connection is not normally connected to another video device 100. That is, the present embodiment refers to an error connection when a video-signal cable is not connected to a DP connector correctly, when another video device 100 does not exist as a destination to be connected with a video-signal cable, or when another video device 100 serving as a destination to be connected with a video-signal cable is not turned on with its power source (or its main power source). In this connection, details of the connection determination part 11 as to how to determine an error connection will be discussed later.

One terminal of the pulldown resistor 31 is connected to the signal line 33. Another terminal of the pulldown resistor 31 is connected to one end of a contact of the switch 32. Another end of the contact of the switch 32 is connected to the ground. That is, the signal line 33 is pulled down to a ground potential via the pulldown resistor 31. For example, the pulldown resistor 31 has a nominal resistance of 100 kΩ. For example, the switch 32 is configured of a relay with a make contact (or a-contact), and therefore the switch 32 turns on the contact when a predetermined voltage VEN is applied to an EN terminal while the switch 32 turns off the contact when 0 V is applied to the EN terminal. In this connection, the switch 32 is not necessarily limited to a relay, and therefore the switch 32 may be configured of a contact (or an open/close part) using a bipolar transistor or a FET (Field-Effect Transistor). The switch 32 can be interposed between the pulldown resistor 31 and the signal line 33. In this case, one terminal of the pulldown resistor 31 is directedly connected to the ground. The voltage applied to the EN terminal becomes equal to the voltage VEN when the main power source of the video device 100 is turned on, while the voltage becomes equal to 0 V when the main power source of the video device 100 is turned off. For example, the main power source of the video device 100 is a power source configured to supply predetermined power to the scaler 20, the video playback part 50, and the video display part 60 in order to process their video signals. For example, those parts may process video signals when the main power source is turned on, while those parts may not process all or part of video signals when the main power source is turned off. When the main power source is turned off, for example, the video device 100 is in a standby state solely validating part of functions when the main power source is turned off. In this configuration, the switch 32 may serve as a contact to make (ON) or break (OFF) the connection between the pulldown resistor 31 and the pulldown potential (e.g. the ground potential in this example), wherein the switch 32 makes (ON) the contact when the main power source of the video device 100 is turned on. The signal line 33 is pulled down via the pulldown resistor 31 when the switch 32 makes its contact ON, while the signal line 33 is not pulled down when the switch 32 breaks its contact OFF.

One terminal of the pullup resistor 41 is connected to the signal line 43. Another terminal of the pullup resistor 41 is connected to one end of a contact of the switch 42. A pullup potential is applied to (e.g. a power-supply line at 2.5 V to 3.3 V (hereinafter, referring to a pullup voltage of 3.3 V) is connected to) another end of the contact of the switch 42. The signal line 43 is pulled up to a power-supply voltage of 3.3 V via the pullup resistor 41. For example, the pullup resistor 41 has a nominal resistance of 1 MΩ. For example, the switch 42 is configured of a relay with a make contact (or an a-contact), and therefore the switch 42 turns on the contact when a predetermined voltage VEN is applied an EN terminal, while the switch 42 turns off the contact when 0 V is applied to the EN terminal. In this connection, the switch 42 is not necessarily limited to a relay, and therefore the switch 42 may be configured of a contact (or an open/close part) using a bipolar transistor or a FET. The switch 42 can be interposed between the pullup resistor 41 and the signal line 43. In this case, one terminal of the pullup resistor 41 I directly connected to the power-supply line of 3.3 V. The voltage applied to the EN terminal of the switch 42 is identical to the voltage applied to the EN terminal of the switch 32. In this case, the switch 42 may server as a contact to make (ON) or break (OFF) the connection between the pullup resistor 41 and the pullup potential (e.g. the power-supply voltage of 3.3 V), wherein the switch 42 makes the contact ON when the main power source of the video device 100 is turned on. The signal line 43 is pulled up via the pullup resistor 41 when the switch 42 makes the contact ON, while the signal line 43 is not pulled up when the switch 42 breaks the contact OFF.

The scaler 20 further includes a DP output part 21 and a DP input part 22. For example, the scaler 20 is configured to receive a video signal input to the DP input part 22 from the DP connector 40, converts the video signal in terms of its format or resolution, and then outputs the converted video signal to the video display part 60. Alternatively, the scaler 20 may convert a video signal input thereto from the video playback part 50 in terms of its format or resolution so as to output the converted video signal from the DP output part 21 to another video device via the DP connector 30. In addition, the scaler 20 may output a video signal input to the DP input part 22 via the DP connector 40 to another video device from the DP output part 21 via the DP connector 30. For example, the DP output part 21 is configured to convert a video signal (or a video signal and an audio signal), which will be output to another video device through a main link, into a predetermined asynchronous stream to be transmitted to its destination, to receive or transmit commands and data on the AUX channel, or to receive a HDP signal from another video device. For example, the DP input part 22 is configured to receive and convert an asynchronous stream, which is transmitted by another video device through a main link, into a video signal having a predetermined format, to receive or transmit commands or data on the AUX channel, or to transmit a HDP signal.

The DP connector 30 and the DP connector 40 may serve as connection parts of unillustrated video-signal cables (or DP cables). The DP connector 30 may serve as an output side (or a source side) of a connection part. The DP connector 40 may serve as an input side (or a sink side) of a connection part.

Figure 15:
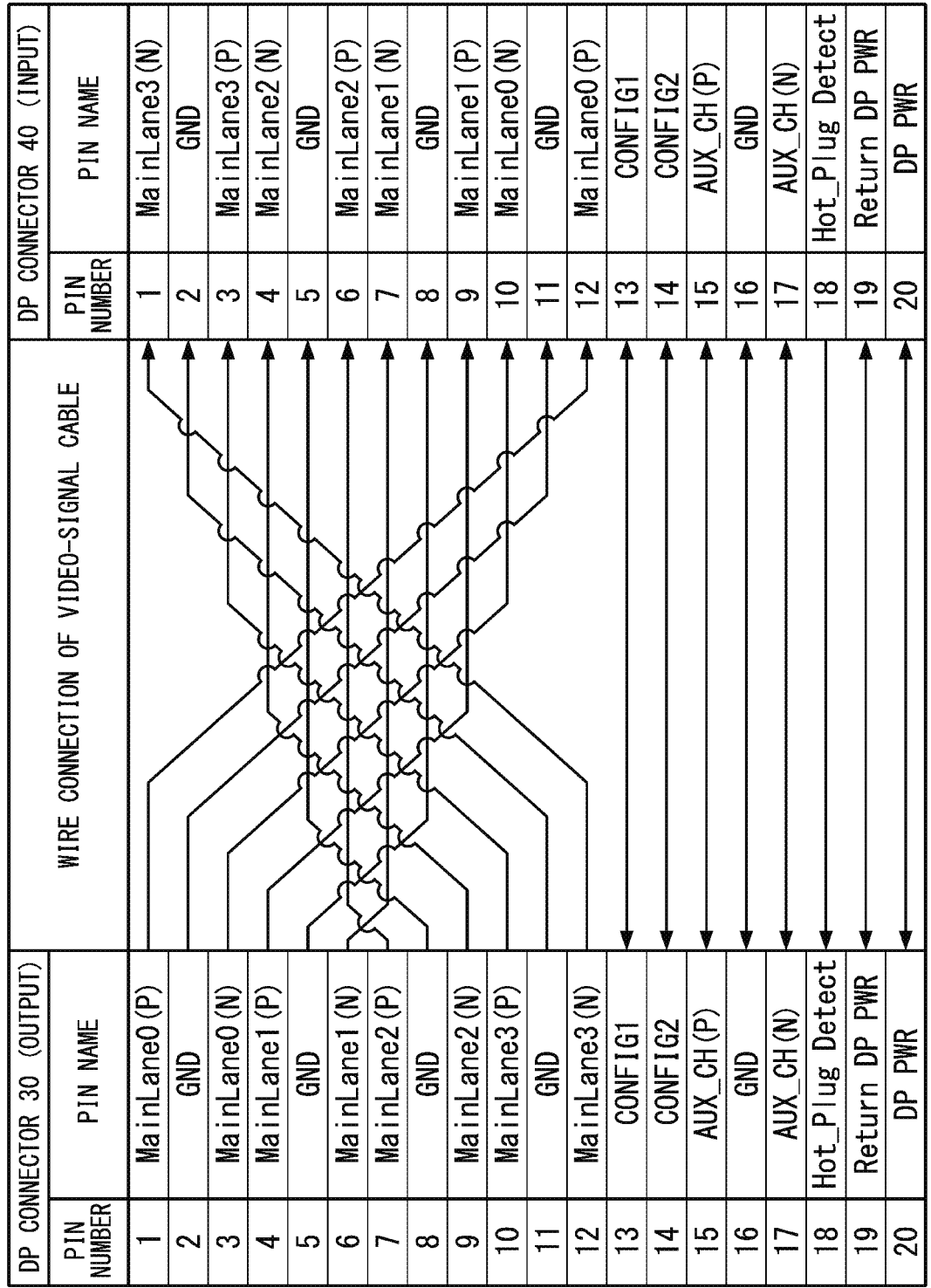
FIG. 15 shows a table describing wire-connecting states of video-signal cables in connection with pin alignments of DP connectors.

Next, wire-connecting states of a video-signal cable for connecting the DP connector 30 and the DP connector 40 of another video device will be described in connection with pin alignments of the DP connector 30 and the DP connector 40 with reference to FIG. 15. Both the DP connector 30 and the DP connector 40 have twenty pins. In the DP connector 30 and the DP connector 40, pin numbers 1 through 12 are allocated to a main link or a ground (GND). The main link is configured of four main lanes, i.e. AC (Alternating Current)-coupled duplex-terminating differential pairs (MainLane0-3 (P), (N)). Herein, the DP connector 30 differ from the DP connector 40 in that different pin numbers are allocated to different lanes. For this reason, a video-signal cable includes a plurality of signal lines which are each connected to different pin numbers. For example, a video-signal cable includes a signal line to connect pin number 1 of the DP connector 30 (output) (pin name: MainLane0 (P)) to pin number 12 of the DP connector 40 (input) (pin name: MainLane0 (P)).

In the DP connector 30 and the DP connector 40, pin numbers 15 through 17 are allocated to an AUX channel and a ground (GND). Herein, pin number 15 (pin name: AUX_CH (P)) and pin number 17 (pin name: AUX_CH (N)) are connected to a differential pair of signal lines on the AUX channel. The AUX channel caries out a half-duplex communication.

In the DP connector 30 and the DP connector 40, pin number 18 (pin name: Hot_Plug_Detect) is allocated to a HPD signal.

In the above, pin number 13 (pin name: CONFIG1) and pin number 14 (pin name: CONFIG2) are currently connected to the ground via pulldown resistors. In addition, pin number 20 (pin name: DP PWR) is a power-supply pin while pin number 19 (pin name: Return DP PWR) is a supplied-power return pin.

Figure 16:
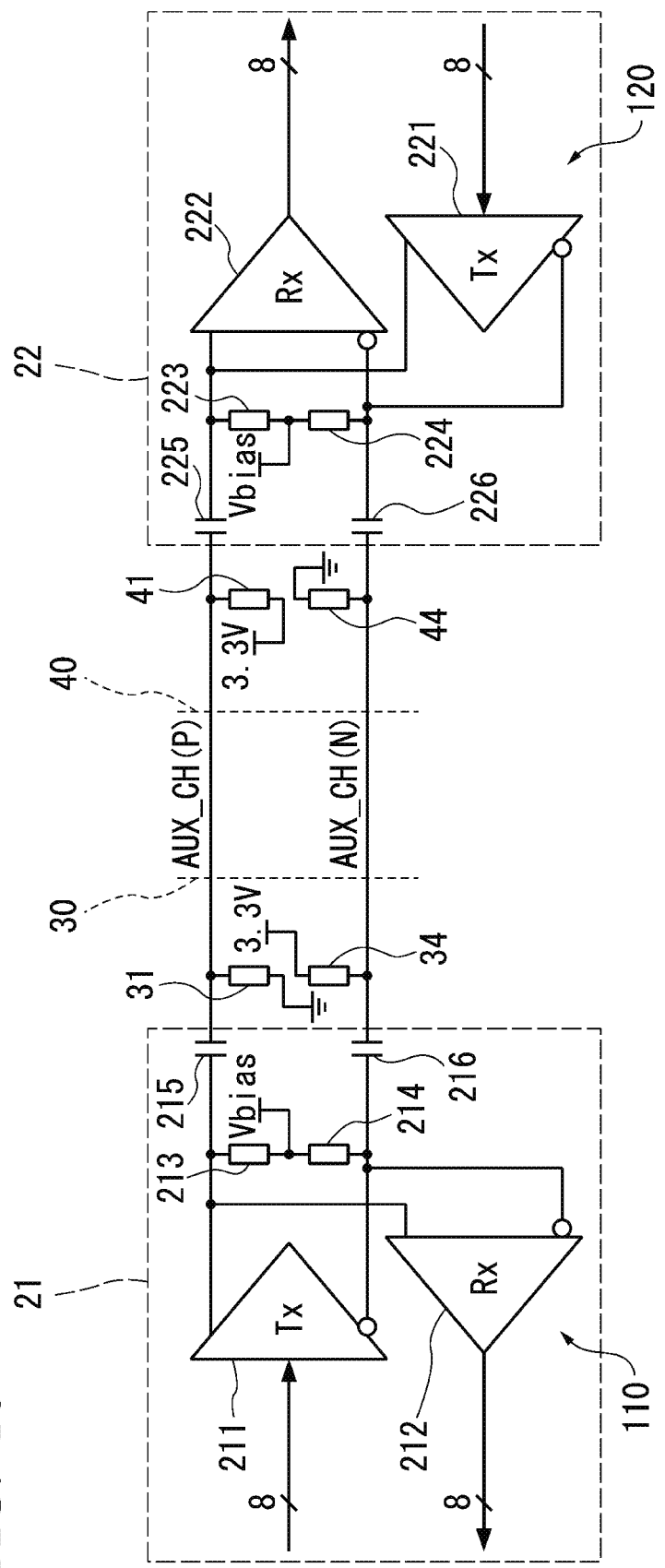
FIG. 16 is a circuit diagram showing a configuration example of an input/output circuit on an AUX channel.

Next, configuration examples will be described with respect to an AUX-channel signal transceiver circuit 110 of the DP output part 21 shown in FIG. 1 and an AUX-channel signal transceiver circuit 120 of the DP input part 22 with reference to FIG. 16. FIG. 16 shows that the AUX-channel signal transceiver 110 of the DP output part 21 in one video device 100 is connected to the AUX-channel signal transceiver 120 of the DP input part 22 in another video device 100 via the DP connector 30 and the DP connector 40 through a video-signal cable. In FIG. 16, constitutional elements identical to those shown in FIG. 1 are denoted by the same reference signs. Herein, FIG. 16 does not show the switch 32 and the switch 42 shown in FIG. 1.

In FIG. 16, the transceiver circuit 110 of the DP output part 21 includes a transmitter 211, a receiver 212, a terminating resistor 213, a terminating resistor 214, an AC-coupled capacitor 215, and an AC-coupled capacitor 216. The transmitter 211 inputs and converts an 8-bit parallel signal into a serial signal, which is transmitted as a differential-pair signal. The receiver 212 receives and converts a differential-pair signal as a serial signal into a 8-bit parallel signal, which is output to anther circuitry.

A pair of signal lines configured to transmit a differential-pair signal are terminated to a bias power source Vbias via the terminating resistor 213 and the terminating resistor 214. For example, both the terminating resistor 213 and the terminating resistor 214 have a resistance of 50Ω. A pair of signal lines configured to transmit a differential-pair signal are connected to one end of the AC-coupled capacitor 215 and one end of the AC-coupled capacitor 216. Another end of the AC-coupled capacitor 215 is connected to an AUX_CH (P) pin while another end of the AC-coupled capacitor 216 is connected to an AUX_CH (N) pin. The AUX_CH (P) pin is pulled down to the ground potential via the pulldown resistor 31, while the AUX_CH (N) pin is pulled up to the power-supply voltage of 3.3 V via the pullup resistor 34. The pullup resistor 34 has the same resistance as the pulldown resistor 31, e.g. 100 kΩ.

The transceiver circuit 120 of the DP input part 22 includes a transmitter 221, a receiver 222, a terminating resistor 223, a terminating resistor 224, an AC-coupled capacitor 225, and an AC-coupled capacitor 226. The transmitter 221 inputs and converts an 8-bit parallel signal into a serial signal, which is transmitted as a differential-pair signal. The receiver 222 receives and converts a differential-pair signal as a serial signal into a 8-bit parallel signal, which is output to anther circuitry.

A pair of signal lines configured to transmit a differential-pair signal are terminated to a bias power source Vbias via the terminating resistor 223 and the terminating resistor 224. Both the terminating resistor 223 and the terminating resistor 224 have a resistance of 50Ω. A pair of signal lines configured to transmit a differential-pair signal are connected to one end of the AC-coupled capacitor 225 and one end of the AC-coupled capacitor 226. Another end of the AC-coupled capacitor 225 is connected to an AUX_CH (P) pin while another end of the AC-coupled capacitor 226 is connected to an AUX_CH (N) pin. The AUX_CH (P) pin is pulled up to the power-supply voltage of 3.3 V via the pullup resistor 41, while the AUX_CH (N) pin is pulled down to the ground potential via the pulldown resistor 44. The pulldown resistor 44 has the same resistance as the pullup resistor 41, e.g. 1 mΩ.

The video playback part 50 is configured to convert a video signal, which is read from a storage device, a storage medium, a communication medium or the like, into a video signal having a predetermined format, which is output to the video display part 60 or the scaler 20. The video display part 60 is configured to display a video, based on the video signal input thereto from the video playback part 50 or the scaler 20, on a display screen, or the video display part 60 projects the video using a projector.

The power source 70 receives the commercially-supplied power to generate a power source having a predetermined voltage to be supplied to various parts of the video device 100. The power source of the power source 70 used to supply voltages to various parts may include a main power source which is turned on during an operation of the video device 100 but turned off during a suspension or standby mode of the video device 100, and another power source which is not turned off in an OFF state of the main power source. In addition, the power source 70 generates signals input to the EN terminals of the switch 32 and the switch 42. The power source 70 applies the voltage VEN to the EN terminals of the switch 32 and the switch 42 in an ON state of the main power source of the video device 100 (see FIG. 1), but the power source 70 applies 0 V to the EN terminals in an OFF state of the main power source (see FIG. 2). Instead of the power source 70, an unillustrated controller configured to control various parts of the video device 100 may generate signals input to the EN terminals.

In the present embodiment, a video signal can be defined as a device configured to process video signals, e.g. any devices configured to input or output video signals, to input video signals, or to output video signals. The processing of video signals may include processes to display, play back, record, or transform video signals, or any combinations of those processes. Therefore, the video device of the present embodiment may not necessarily include one or both of the video playback part 50 and the video display part 60. In addition, the video device 100 may not necessarily include either the DP connector 30 or the DP connector 40.

Next, the video device 100 will be described with respect to operation examples when the video device 100 shown in FIG. 1 is connected to another video device 100 through a video-signal cable or when a video-signal cable is simply connected to the video device 100 of FIG. 1 with reference to FIG. 3 through FIG. 13.

Figure 3:
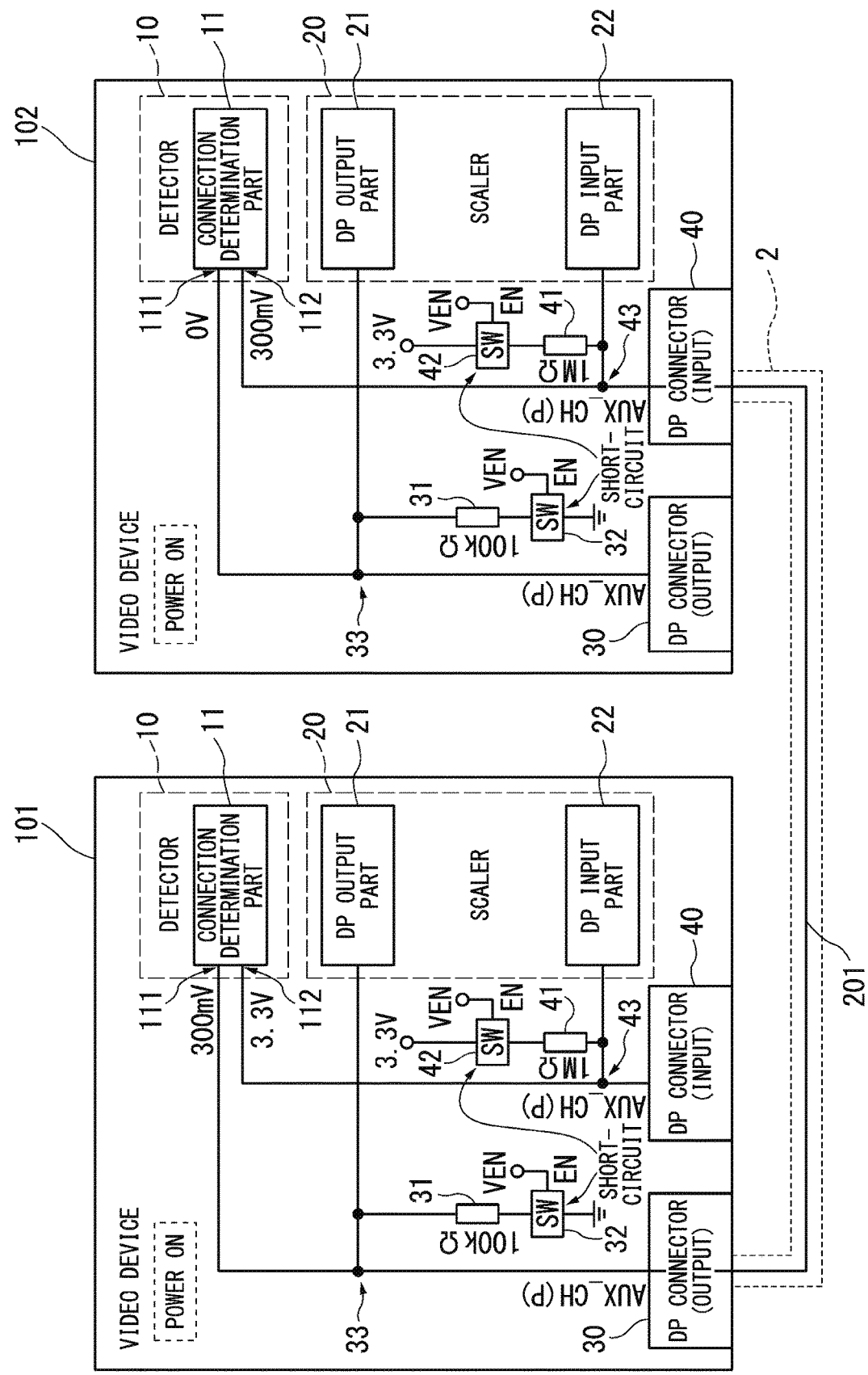
FIG. 3 is a block diagram showing a configuration example of a video display system according to one embodiment of the present invention.

FIG. 3 is a block diagram showing a video display system 1 according to one embodiment of the present invention. The video display system 1 shown in FIG. 3 includes a video device 101, a video device 102, and a video-signal cable 2. The video device 101 and the video device 102 have the same configuration as the video device 100 shown in FIG. 1. FIG. 3 does not illustrate the video playback part 50, the video display part 60, and the power source 70 shown in FIG. 1. In the video display system 1 shown in FIG. 3, the video device 101 serves as an output side of video signals while the video device 102 servers as an input side of video signals. In this case, the video display system 1 shown in FIG. 3 needs to establish a proper connection in which the DP connector 30 (output) of the video device 101 is connected to the DP connector 40 (input) of the video device 102 through the video-signal cable 2. In FIG. 3, both the main power source of the video device 101 and the main power source of the video device 102 are turned on. In addition, the pulldown resistor 31 has a resistance of 100 kΩ while the pullup resistor 41 has a resistance of 1 mΩ, wherein the pullup voltage (i.e. a potential difference between a ground potential and a pullup potential) is 3.3 V.

In FIG. 3, the AUX_CH (P) pin of the DP connector 30 of the video device 101 is connected to the AUX_CH (P) pin of the DP connector 40 of the video device 102 through a signal line 201 of the video-signal cable 2. In this case, the signal line 33 of the video device 101 is connected to the signal line 43 of the video device 102. In the video device 101 and the video device 102, both the switch 32 and the switch 42 make their contacts ON (i.e. short-circuited). Therefore, the voltage at the input terminal 111 of the connection determination part 11 of the video device 101 and the voltage at the input terminal 112 of the connection determination part 11 of the video device 102 are each set to a partial voltage divided by the pullup resistor 41 and the pulldown resistor 31, i.e. 300 mV=3.3 V×100 kΩ/(100 kΩ+1 mΩ). In this connection, the voltage at the input terminal 112 of the connection determination part 11 of the video device 11 is set to 3.3 V while the voltage at the input terminal 111 of the connection determination part 11 of the video device 102 is set to 0 V.

In the video display system 1 shown in FIG. 3 in which the video device 101 is properly connected to the video device 102 through the video-signal cable 2, the voltage at the input terminal 111 of the connection determination part 11 of the video device 101 is set to 300 mV. Due to an improper connection which will be discussed later, the voltage at the input terminal 111 of the connection determination part 11 of the video device 101 is set to 0 V. That is, it is possible to determine the occurrence of an error connection when the voltage at the input terminal 111 of the connection determination part 11 of the video device 101 is 0 V, while it is possible to determine a proper connection when the voltage at the input terminal 111 is 300 mV. According to the DP, it is stipulated that the pullup voltage may range from 2.5 V to 3.3 V. In addition, the pulldown resistor 31 may have a resistance ranging from 10 kΩ to 105 kΩ. In this case, for example, the voltage at the input terminal 111 of the connection determination part 11 may range from 23.6 mV to 328 mV when a proper connection is established. Therefore, the connection determination part 11 determines a proper connection when the voltage of the AUX_CH (P) pin falls within a predetermined range of voltages, but the connection determination part 11 determines an error-connection state when the voltage is out of the predetermined range of voltages.

Figure 4:
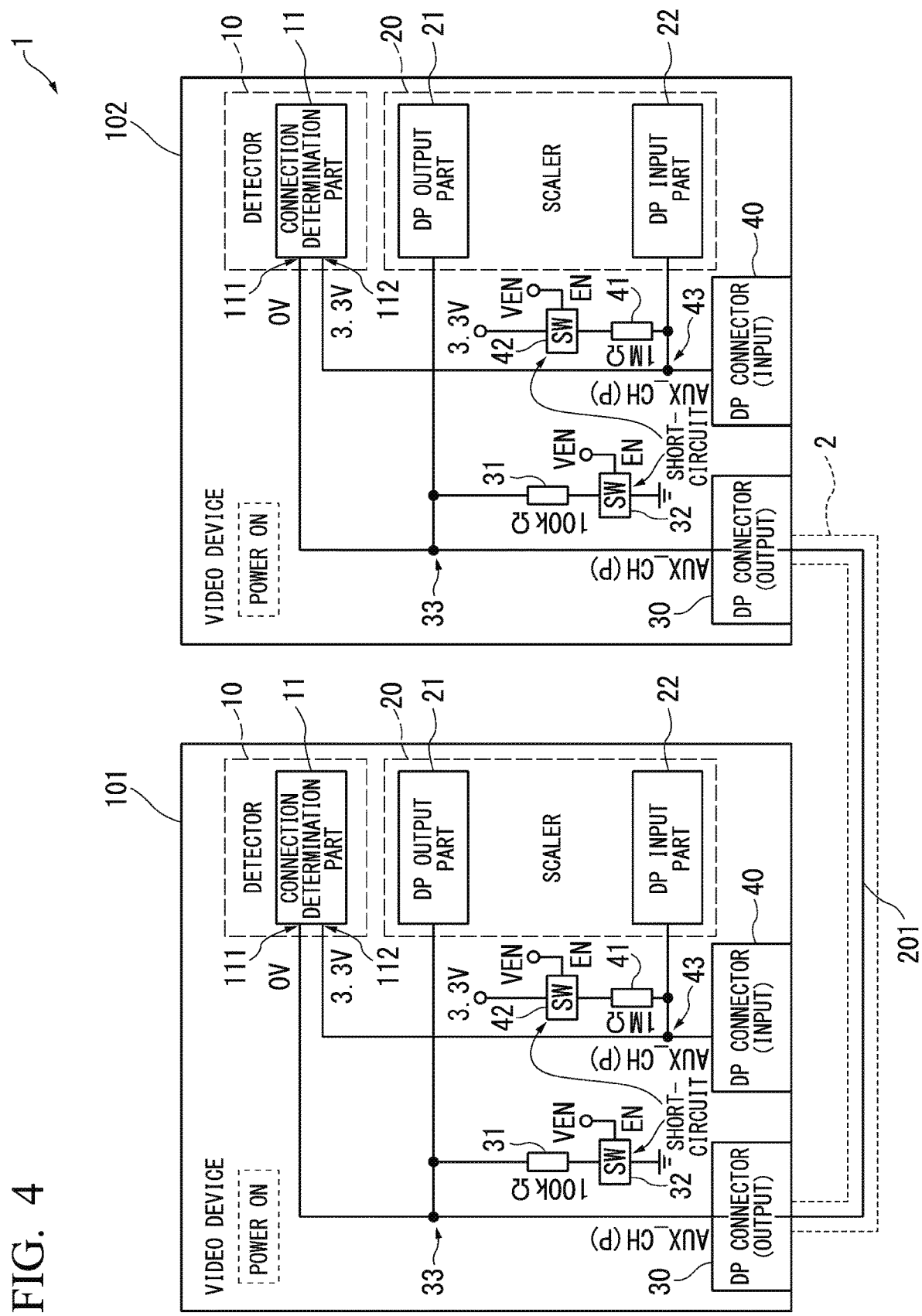
FIG. 4 is a block diagram showing an operation example of a video display system 1 shown FIG. 3 due to an error connection of a video-signal cable 2.

Next, an example of an error connection of the video-signal cable 2 occurring in the video display system 1 shown in FIG. 3 will be described with reference to FIG. 4. FIG. 4 shows an example in which the video device 101 serves as an output side (similar to other examples shown in FIG. 5 through FIG. 11) while the video device 102 servers as an input side (similar to other examples shown in FIG. 5 through FIG. 9) and in which the DP connector 30 (output) of the video device 101 is connected to the DP connector 30 (output) of the video device 102 through the video-signal cable 2. In addition, the main power source of the video device 101 and the main power source of the video device 102 are turned on.

In FIG. 4, the AUX_CH (P) pin of the DP connector 30 (output) of the video device 101 is connected to the AUX_CH (P) pin of the DP connector 30 (output) of the video device 102 through the signal line 201 of the video-signal cable 2. In this case, the signal line 33 of the video device 101 is connected to the signal line 33 of the video device 102. In the video device 101 and the video device 102, the switch 32 and the switch 42 make their contacts ON (short-circuited). Therefore, the voltage at the input terminal 111 of the connection determination part 11 of the video device 101 and the voltage at the input terminal 111 of the connection determination part 11 of the video device 102 are set to 0 V. In addition, the voltage at the input terminal 112 of the connection determination part 11 of the video device 101 and the voltage at the input terminal 112 of the connection determination part 11 of the video device 102 are set to 3.3 V. In this case, the connection determination part 11 of the video device 101 may determine the occurrence of an error connection since the voltage at the input terminal 111 is 0 V (which is not 300 mV).

Figure 5:
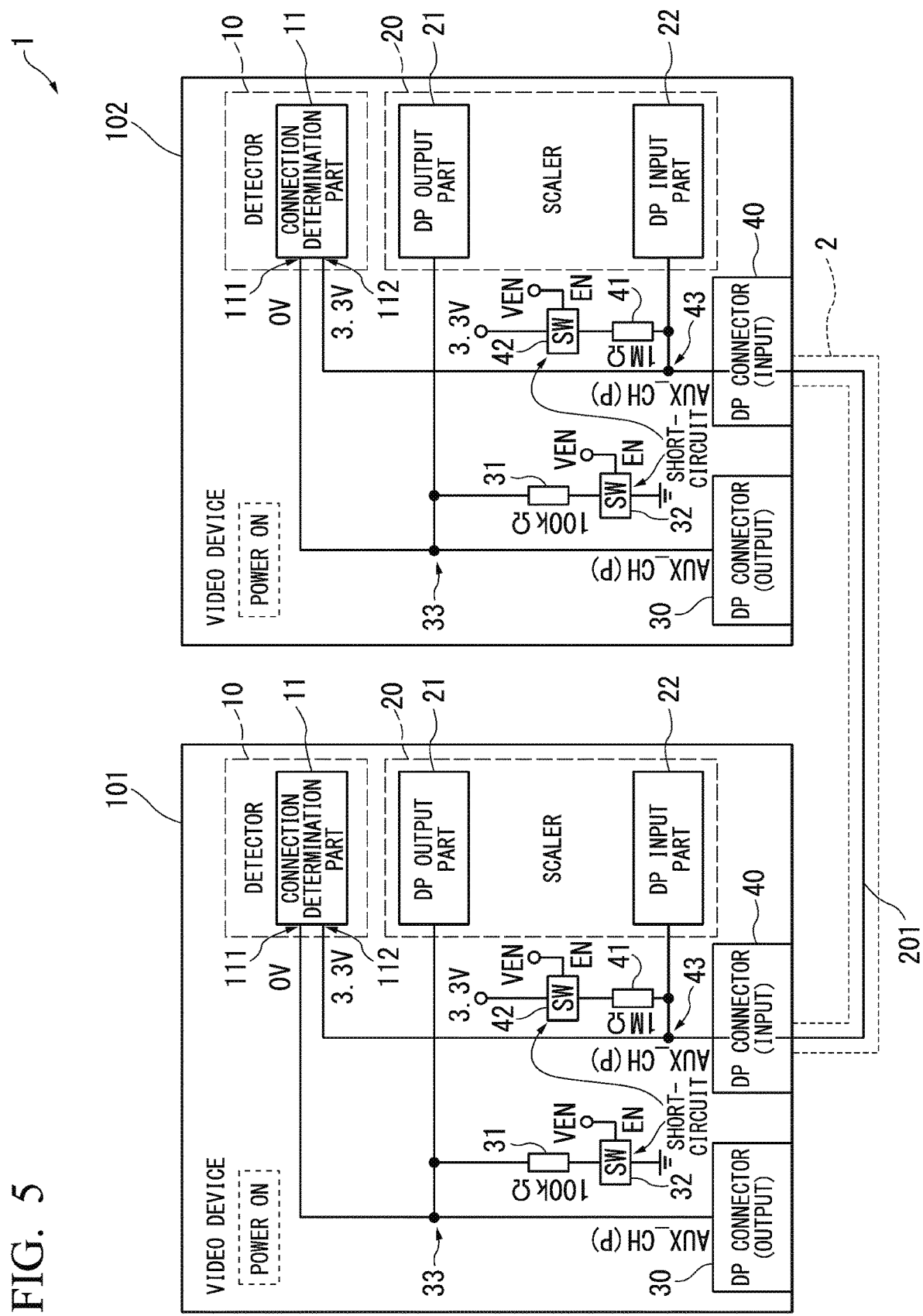
FIG. 5 is a block diagram showing another operation example of the video display system 1 shown in FIG. 3 due to an error connection of the video-signal cable 2.

Next, another example of an error connection of the video-signal cable 2 occurring in the video display system 1 shown in FIG. 3 will be described with reference to FIG. 5. In FIG. 5, the DP connector 40 (input) of the video device 101 is connected to the DP connector 40 (input) of the video device 102 through the video-signal cable 2. In addition, the main power source of the video device 101 and the main power source of the video device 102 are turned on.

In FIG. 5, the AUX_CH (P) pin of the DP connector 40 (input) of the video device 101 is connected to the AUX_CH (P) pin of the DP connector 40 (input) of the video device 102 through the signal line 201 of the video-signal cable 2.

In this case, the signal line 43 of the video device 101 is connected to the signal line 43 of the video device 102. In the video device 101 and the video device 102, the switch 32 and the switch 42 make their contacts ON (short-circuited). In addition, the AUX_CH (P) pin of the DP connector 30 (output) of the video device 101 is open. Therefore, the voltage at the input terminal 112 of the connection determination part 11 of the video device 101 and the voltage at the input terminal 112 of the connection determination part 11 of the video device 102 are set to 3.3 V. In addition, the voltage at the input terminal 111 of the connection determination part 11 of the video device 101 and the voltage at the input terminal 111 of the connection determination part 11 of the video device 102 are set to 0 V. In this case, the connection determination part 11 of the video device 101 may determine the occurrence of an error connection since the voltage at the input terminal 111 is 0 V (which is not 300 mV).

Figure 6:
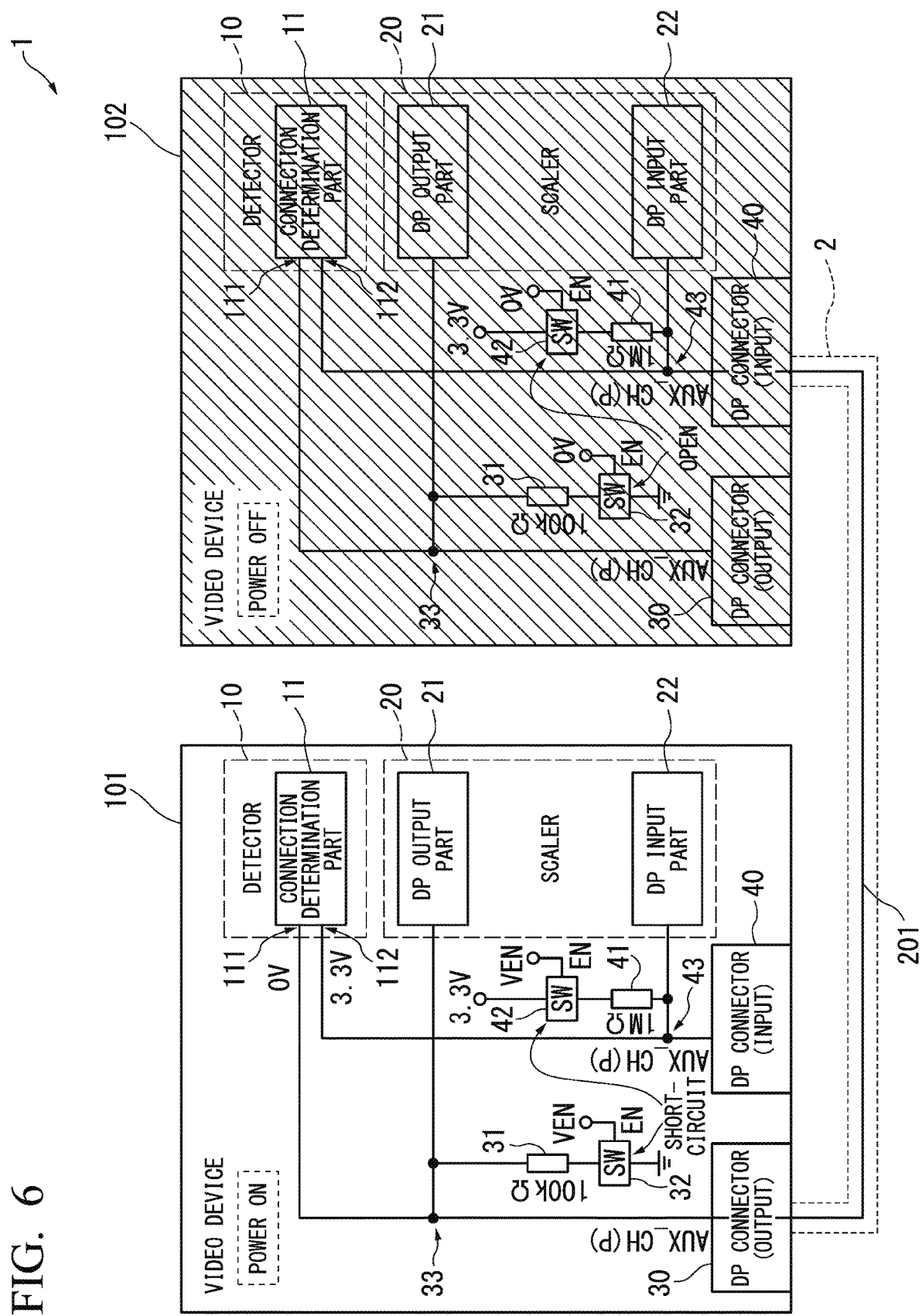
FIG. 6 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 6. In FIG. 6, the DP connector 30 (output) of the video device 101 is properly connected to the DP connector 40 (input) of the video device 102 through the video-signal cable 2. However, the main power source of the video device 101 is turned on while the main power source of the video device 102 is turned off.

In FIG. 6, the AUX_CH (P) pin of the DP connector 30 (output) of the video device 101 is connected to the AUX_CH (P) pin of the DP connector 40 (input) of the video device 102 through the signal line 201 of the video-signal cable 2. In this case, the signal line 33 of the video device 101 is connected to the signal line 43 of the video device 102. The switch 32 (or a second switch) and the switch 42 (or a second switch) make their contacts ON (short-circuited) in the video device 101, while the switch 32 (or a first switch) and the switch 42 (or a first switch) make their contacts OFF (open) in the video device 102. Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

In FIG. 6, the switch 42 makes its contact OFF in the video device 102, and therefore the signal line 43 of the video device 101 is not pulled up to the power source of 3.3 V. In the video device 102, for example, the power source of 3.3 V for control circuitry may be occasionally turned on even when the main power source is OFF. In this case, the present embodiment is designed to prevent the signal line connected to the AUX_CH (P) pin from being pulled down or pulled up by turning off the contacts of the switches 32 and 42. Irrespective of a proper connection of the video-signal cable 2 to be established in an OFF state of the main power source of the video device 102, it is possible for the connection determination part 11 of the video device 101 to detect an improper connection due to an OFF state of the main power source of the video device 102.

Figure 7:
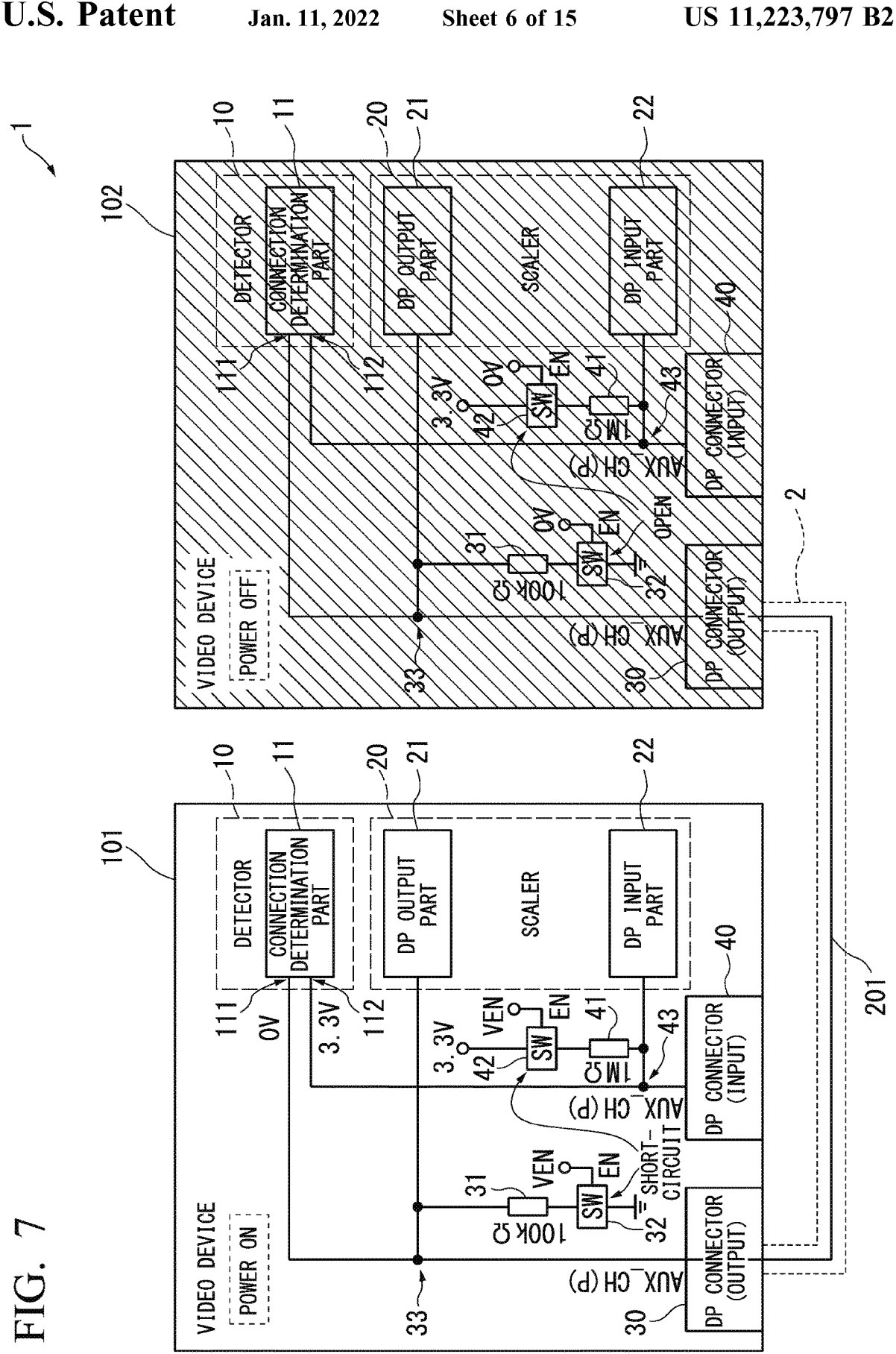
FIG. 7 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 7. In FIG. 7, the DP connector 30 (output) of the video device 101 is connected to the DP connector 30 (output) of the video device 102 through the video-signal cable 2. In addition, the main power source of the video device 101 is turned on while the main power source of the video device 102 is turned off.

In FIG. 7, the AUX_CH (P) pin of the DP connector 30 (output) of the video device 101 is connected to the AUX_CH (P) pin of the DP connector 30 (output) of the video device 102 through the signal line 201 of the video-signal cable 2. In this case, the signal line 33 of the video device 101 is connected to the signal line 33 of the video device 102. The switch 32 and the switch 42 make their contacts ON (short-circuited) in the video device 101, while the switch 32 and the switch 42 make their contacts OFF (open) in the video device 102. Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

Figure 8:
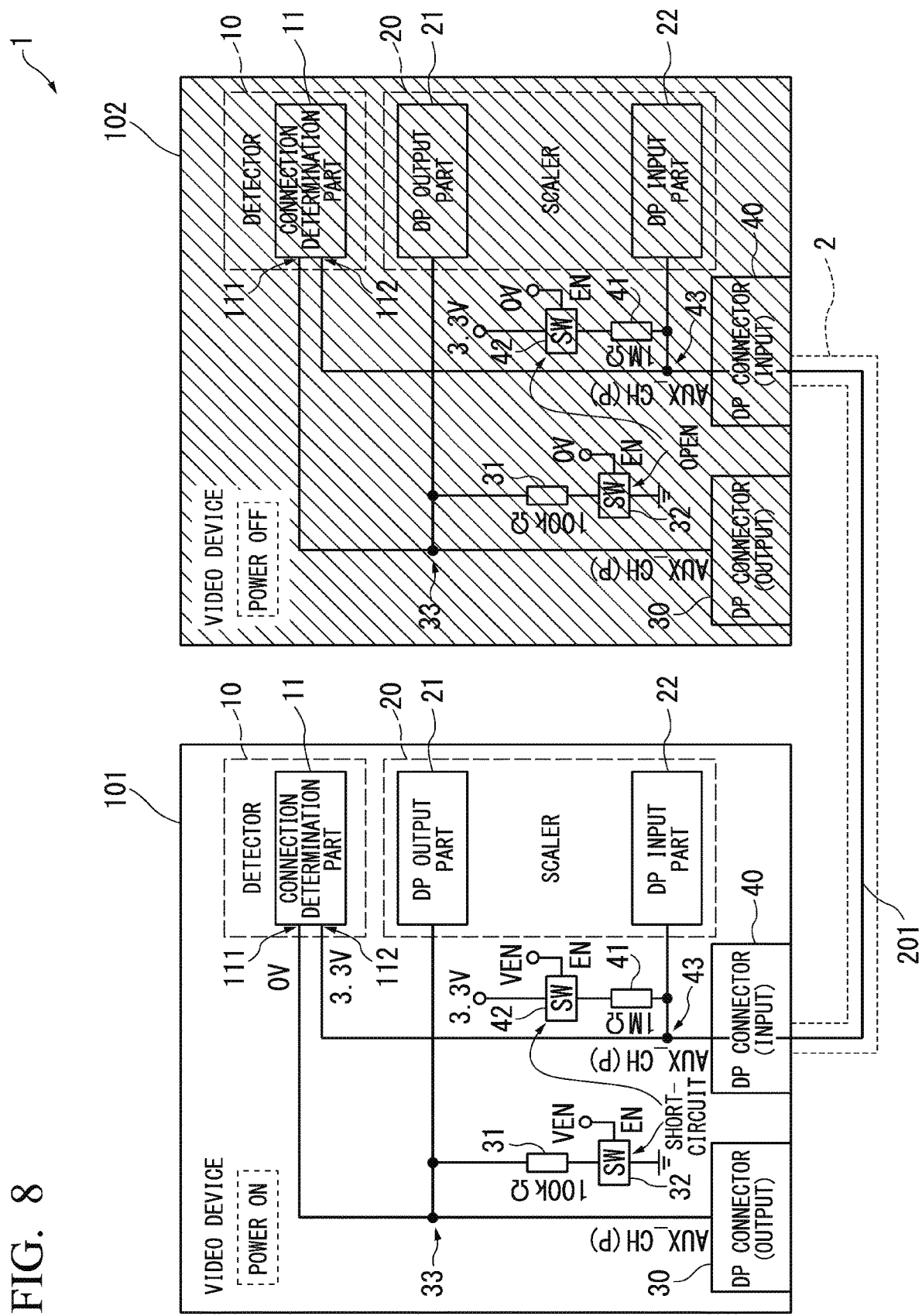
FIG. 8 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 8. In FIG. 8, the DP connector 40 (input) of the video device 101 is connected to the DP connector 40 (input) of the video device 102 through the video-signal cable 2. In addition, the main power source of the video device 101 is turned on while the main power source of the video device 102 is turned off.

In FIG. 8, the AUX_CH (P) pin of the DP connector 40 (input) of the video device 101 is connected to the AUX_CH (P) pin of the DP connector 40 (input) of the video device 102 through the signal line 201 of the video-signal cable 2. In this case, the signal line 43 of the video device 101 is connected to the signal line 43 of the video device 102. The switch 32 and the switch 42 make their contacts ON (short-circuited) in the video device 101, while the switch 32 and the switch 42 make their contacts OFF (open) in the video device 102. In addition, the AUX_CH (P) of the DP connector 30 (output) of the video device 101 is open. Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

Figure 9:
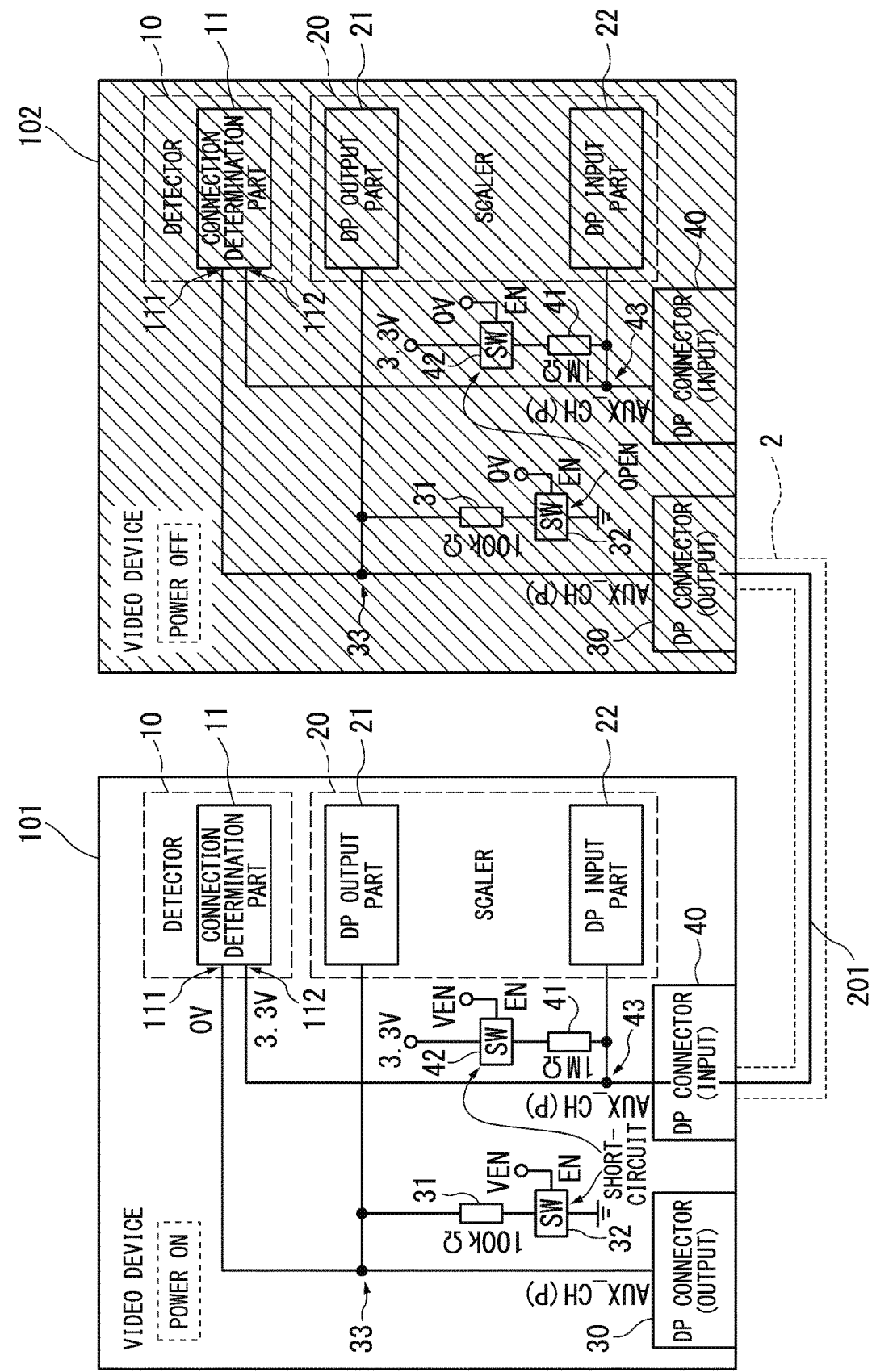
FIG. 9 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 9. In FIG. 9, the DP connector 40 (input) of the video device 101 is connected to the DP connector 30 (output) of the video device 102 through the video-signal cable 2. In addition, the main power source of the video device 101 is turned on while the main power source of the video device 102 is turned off.

In FIG. 9, the AUX_CH (P) pin of the DP connector 40 (input) of the video device 101 is connected to the AUX_CH (P) pin of the DP connector 30 (output) of the video device 102 through the signal line 201 of the video-signal cable 2. In this case, the signal line 43 of the video device 101 is connected to the signal line 33 of the video device 102. The switch 32 and the switch 42 make their contacts ON (short-circuited) in the video device 101, while the switch 32 and the switch 42 make their contacts OFF (open) in the video device 102. In addition, the AUX_CH (P) of the DP connector 30 (output) of the video device 101 is open. Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

Figure 10:
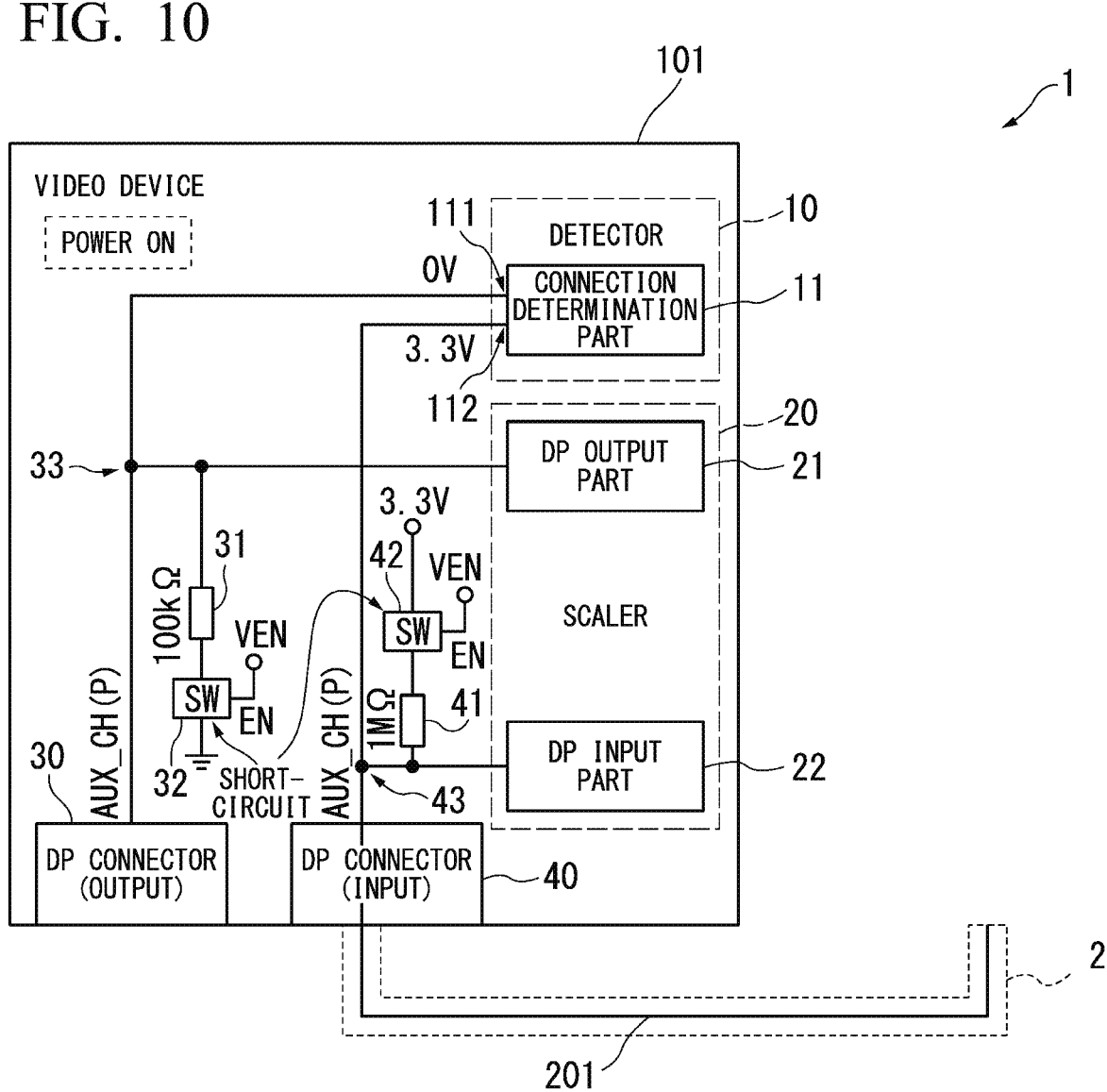
FIG. 10 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 10. In FIG. 10, the video-signal cable 2 is connected to the DP connector 40 (input) of the video device 101, but the video-signal cable 2 is not connected to its destination, i.e. the video device 102. In this connection, the main power source of the video device 101 is turned on.

In FIG. 10, the AUX_CH (P) pin of the DP connector 30 (output) of the video device 101 is open. In addition, another end of the signal line 201 of the video-signal cable 2, which is connected to the AUX_CH (P) pin of the DP connector 40 (input), is open. In the video device 101, the switch 32 and the switch 42 make their contacts ON (short-circuited). Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

Figure 11:
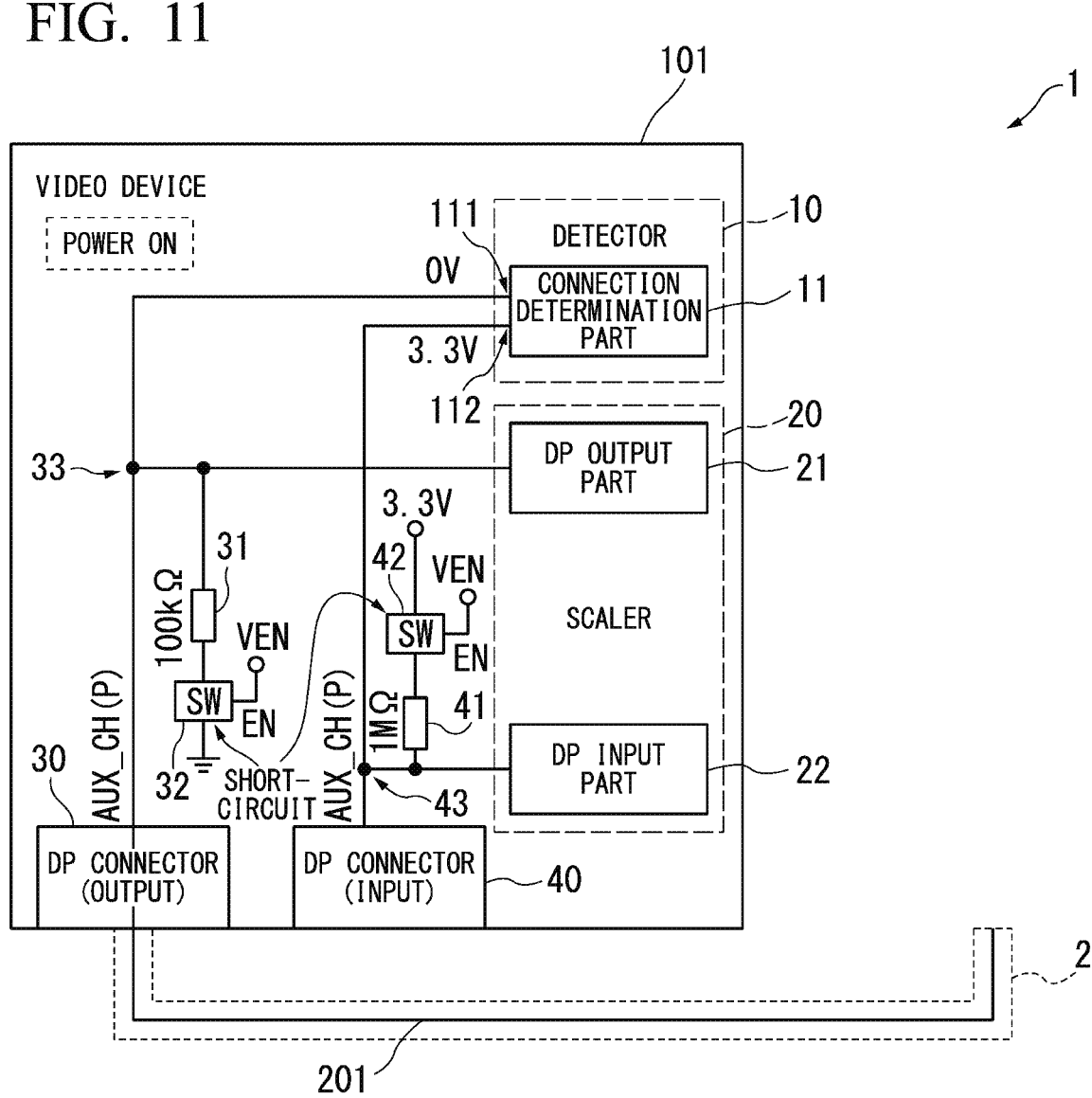
FIG. 11 is a block diagram showing a further operation example of the video display system 1 shown in FIG. 3 due to an error connection of the video-signal cable 2.

Next, a further example of an error connection occurring in the video display system 1 shown in FIG. 3 will be described with reference to FIG. 11. In FIG. 11, the video-signal cable 2 is connected to the DP connector 30 (output) of the video device 101, but the video-signal cable 2 is not connected to its destination, i.e. the video device 102. In this connection, the main power source of the video device 101 is turned on.

In FIG. 11, another end of the signal line 201 of the video-signal cable 2, which is connected to the AUX_CH (P) pin of the DP connector 30 (output) of the video device 101, is open, and therefore the AUX_CH (P) pin of the DP connector 30 (output) is open. In the video device 101, the switch 32 and the switch 42 make their contacts ON (short-circuited). Therefore, the voltage at the input terminal 111 of the connection determination part 11 of the video device 101 is set to 0 V. In addition, the voltage at the input terminal 112 of the connection determination part 11 of the video device 101 is set to 3.3 V. In this case, the connection determination part 11 of the video device 101 may determine the occurrence of an error connection since the voltage at the input terminal 111 is 0 V (which is not 300 mV).

Figure 12:
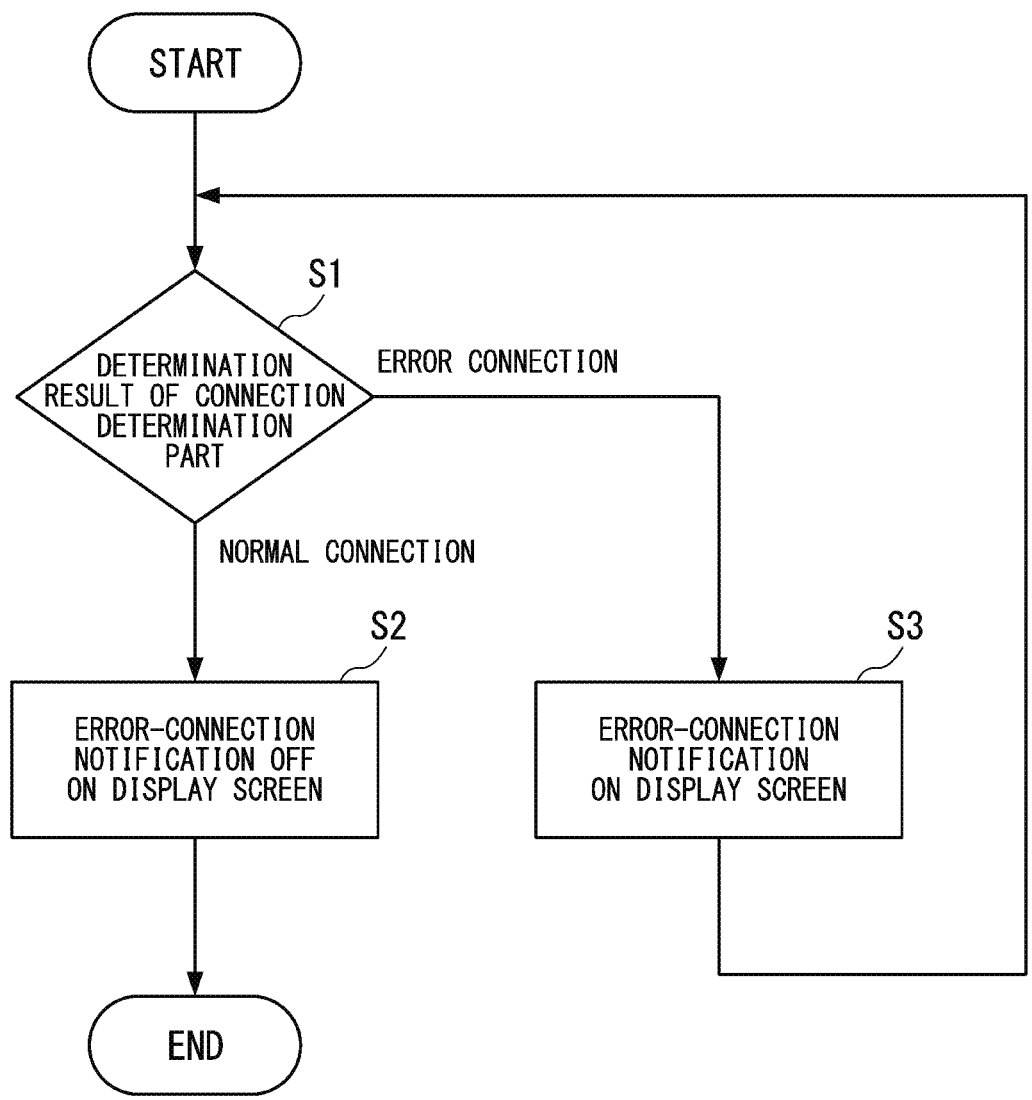
FIG. 12 is a flowchart showing an operation example of a video device 101 shown in FIG. 3.

Next, a determination process of the connection determination part 11 of the video device 101 shown in FIG. 3 and a notification process of notifying a determination result of the connection determination part 11 will be described with reference to FIG. 12 and FIG. 13. FIG. 12 is a flowchart showing the determination process of the connection determination part 11 of the video device 101 and the notification process of notifying the determination result of the connection determination part 11. FIG. 13 shows a table used to explain the content of the determination process of the connection determination part 11.

Figure 2:
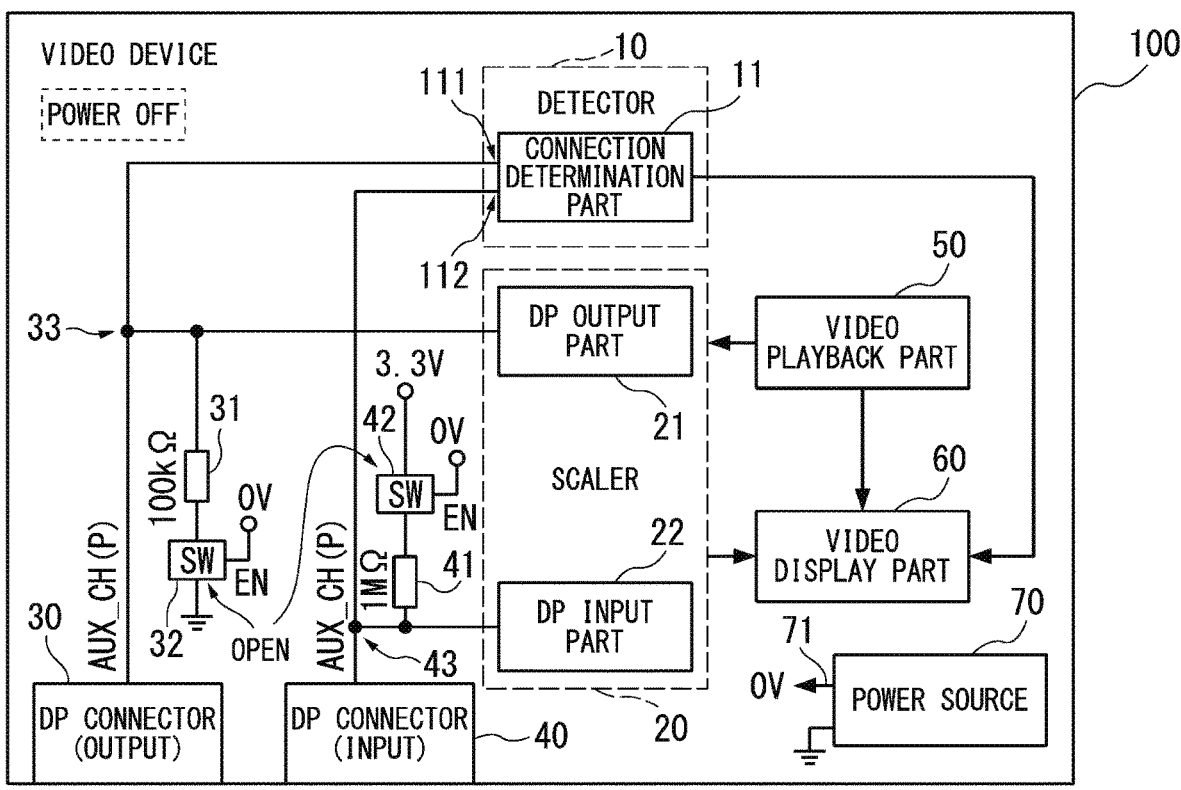
FIG. 2 is a block diagram used to explain an operation example of a video device 100 shown in FIG. 1.

The process shown in FIG. 12 is executed by the video device 101 shown in FIG. 3 every predetermined time after the main power source of the video device 101 is turned on or when the connection determination part 11 determines an error connection. When the main power source of the video device 101 shown in FIG. 3 is turned on if the video device 101 serves as an output side, for example, the connection determination part 11 determines whether or not the video-signal cable 2 is properly connected to another video device based on the voltage at the input terminal 111 (step S1). Alternatively, when the main power source of the video device 101 shown in FIG. 2 is turned on if the video device 101 serves as an input side, the connection determination part 11 determines whether or not the video-signal cable 2 is properly connected to another video device based on the voltage at the input terminal 112 (step S1).

In step S1, the connection determination part 11 detects the voltage at the input terminal 111 or the voltage at the input terminal 112, and therefore the connection determination part 11 may determine a normal connection when the detected voltage at the input terminal 111 or at the input terminal 112 falls within a range of voltages deviated from the partial voltage, which is produced by dividing the pullup voltage between the pullup resistor 41 and the pulldown resistor 31, depending on the upper/lower-limit values of the pullup voltage and the upper/lower-limit values of resistances of the pullup resistor 41 and the pulldown resistor 31. In step S1, the connection determination part 11 determines an error connection when the voltage at the input terminal 111 or at the input terminal 112 does not fall within the aforementioned range of voltages used to determine a normal connection.

Upon determining a normal connection (i.e. "NORMAL CONNECTION" in step S1), for example, the connection determination part 11 carries out a process to turn off an error-connection notification displayed on the display screen of the video device 101 (step S2), thus exiting the process of FIG. 12. Upon determining an error connection (i.e. "ERROR CONNECTION" in step S1), for example, the connection determination part 11 carries out a process to make an error-connection notification on the display screen of the video device (step S3), thus exiting the process of FIG. 12. For example, the error-connection notification may be a message urging a user to confirm the connected connector or the status of the device serving as a destination. For example, it is possible to display a message "Please confirm the connected port or the status of the device to be connected thereto".

FIG. 13 shows the relationship between the determination result of the connection determination part 11 of the video device 101, the determination result of the connection determination part 11 of the video device 102, the DP connector to be connected with the video-signal cable 2, the voltage at the input terminal 111 and the voltage at the input terminal 112 in the video device 101 and the video device 102, and the ON/OFF status of the main power source of the video device 102 in the video display system 1 shown in FIG. 3. When "CABLE CONNECTION CONNECTOR" is "OUTPUT", it indicates that the video-signal cable 2 is connected to the DP connector 30 (output). When "CABLE CONNECTION CONNECTOR" is "INPUT", it indicates that the video-signal cable 2 is connected to the DP connector 40 (input).

In FIG. 13, the case (1) indicating an example of a normal connection between the video device 101 serving as the output side and the video device 102 serving as the input side as shown in FIG. 3. The case (2) indicates an error connection shown in FIG. 4. The case (3) indicates an error connection shown in FIG. 5. The case (4) indicate an error connection shown in FIG. 6. The case (5) indicates an error connection shown in FIG. 7. The case (6) indicates an error connection shown in FIG. 8. The case (7) indicates an error connection shown in FIG. 9. The case (8) indicates an error connection shown in FIG. 10. The case (9) indicates an error connection shown in FIG. 11. The case (10) indicates an example of the configuration shown in FIG. 3 in which the video-signal cable 2 is reconnected between the DP connector 40 (input) of the video device 101 and the DP connector 30 (output) of the video device 102. That is, the case (10) indicates a normal connection between the video device 101 serving as the input side and the video device 102 serving as the output side.

As shown in FIG. 13, either the voltage at the input terminal 111 or the voltage at the input terminal 112 in the connection determination part 11 of the video device 101 is set to 300 mV in a normal connection (i.e. the case (1) or the case (10)) but set to 0 V or 3.3 V other than 300 mV in a non-normal connection, i.e. other cases (2) through (9). In a normal connection (i.e. the case (1)) when the video device 101 serves as the output side while the video device 102 servers as the input side, the voltage at the input terminal 111 of the connection determination part 11 of the video device 101 is set to 300 mV but set to 0 V in other cases (2) through (10). In a normal connection (i.e. the case (10)) when the video device 101 serves as the input side while the video device 102 serves as the output side, the voltage at the input terminal 112 of the connection determination part 11 of the video device 101 is set to 300 mV but set to 3.3 V in other cases (1) through (9). Therefore, when the video device 101 serves as the output side while the video device 102 serves as the input side, the connection determination part 11 of the video device 101 may determine whether the connected state is normal or not based on the voltage at the input terminal 111 (i.e. a potential difference between the potential of the input terminal 111 and the ground potential).

When the video device 101 serves as the input side while the video device 102 serves as the output side, the connection determination part 11 of the video device 101 may determine whether the connected state is normal or not based on the voltage at the input terminal 112 (i.e. a potential difference between the potential of the input terminal 112 and the ground potential).

Similar to the video device 101, the video device 102 includes the connection determination part 11 configured to determine whether or not the video-signal cable 2 is connected normally. In this case, it is necessary to partially modifying the table of FIG. 13 by substituting "VIDEO DEVICE 102" for "VIDEO DEVICE 101" and by substituting "VIDEO DEVICE 101" for "VIDEO DEVICE 102".

As described above, the present embodiment does not need to carry out a process to confirm the content of a communication between video devices, and therefore it is possible to determine the existence/nonexistence of an error connection of a video-signal cable with a simple configuration.

According to the present embodiment, when a video device is connected to another video device through a video-signal cable, it is possible to determine the correct/incorrect connection considering an error connection in which another video device is turned off in power, thus notifying the determination result to a user. That is, it is possible to notify a user of a non-normal connection even when no power is supplied to a video device serving as a connected destination. In addition, it is possible to notify a user of an event in which no device is connected to the connected destination of a video device.

Figure 14:
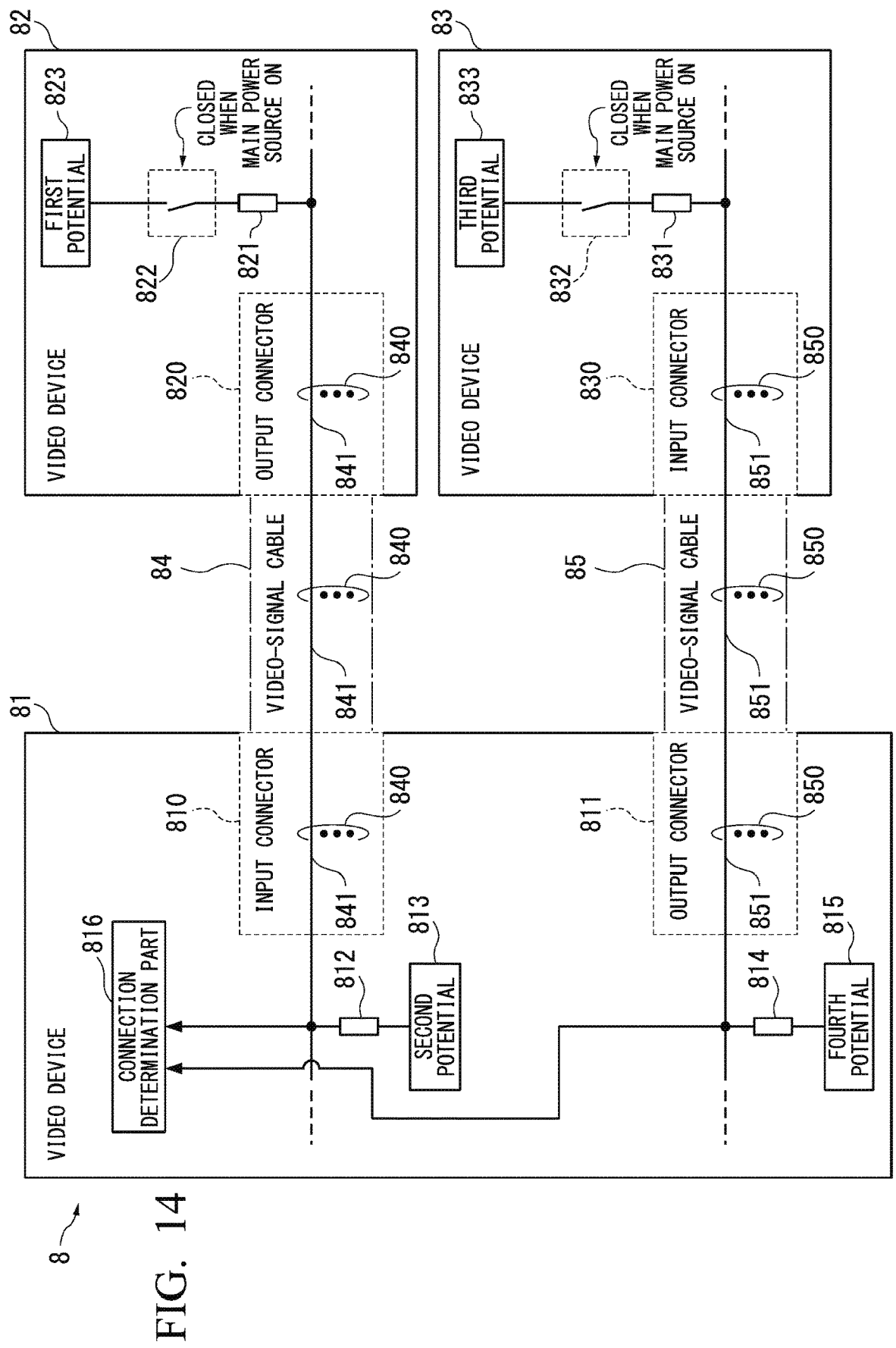
FIG. 14 is a block diagram showing an example of a fundamental configuration of a video display system according to one embodiment of the present invention.

Next, an example of a fundamental configuration of the present embodiment will be described with reference to FIG. 14. FIG. 14 is a block diagram showing an example of the fundamental configuration according to the present embodiment of the present invention. FIG. 14 shows a video display system 8 including a video device 81, a video device 82, and a video device 83. The video device 81 further includes an input connector 810, an output connector 811, a first resistor 812, a third resistor 814, and a connection determination part 816. The video device 82 further includes an output connector 820, a second resistor 821, and a first switch 822. The video device 83 further includes an input connector 830, a fourth resistor 831, and a second switch 832. All the input connector 810, the output connector 811, the output connector 820, and the input connector 830 are configured of DP connectors.

The input connector 810 of the video device 81 is normally connected to the output connector 820 of the video device 82 through a video-signal cable 84 configured to transmit a video signal. The output connector 811 of the video device 81 is normally connected to the input connector 830 of the video device 83 through a video-signal cable 85 configured to transmit a video signal. In the video display system 8 shown in FIG. 14, three video devices 81-83 are daisy-chained together in an order of the video device 82, the video device 81, and the video device 83.

Similar to the video device 81, the video device 82 may further include an input connector and a connection determination part. Similar to the video device 81, the video device 83 may further include an output connector and a connection determination part. However, the video device 82, corresponding to the top position of a daisy-chain connection, does not carry out a connection determination with respect to "input". In addition, the video device 83, corresponding to the last position of a daisy-chain connection, does not carry out a connection determination with respect to "output". Moreover, the video device 81 does not need to include one of the input connector 810 and the output connector 811. In this case, it is necessary to omit either the first resistor 812 or the third resistor 814.

In the video device 81, a first signal line 841, i.e. one of multiple signal lines 840 connected to the input connector 810, is connected to a second potential 813 different from a first potential 823 via the first resistor 812. In the video device 82, the first signal line 841 is connected to the first potential 823 via the second resistor 821 and the first switch 822 which is closed when the main power source of the video device 82 is turned on.

In the video device 81, a second signal line 851, i.e. one of multiple signal lines 850 connected to the output connector 811, is connected to a fourth potential 815 different from a third potential 833 via the third resistor 814. In the video device 83, the second signal line 851 is connected to a third potential 833 via the fourth resistor 831 and the second switch 832 which is closed when the main power source of the video device 83 is turned on.

The connection determination part 816 determines whether or not the video-signal cable 84 or the video-signal cable 85 is connected normally based on the potential of the first signal line 841 or the potential of the second signal line 851. For example, the connection determination part 816 determines that the video-signal cable 84 is connected normally when the potential of the first signal line 841 corresponds to a partial potential which is produced by dividing a potential difference between the first potential 823 and the second potential 813 using a series circuit consisting of the first resistor 812 and the second resistor 821 or that the video-signal cable 85 is connected normally when the potential of the second signal line 851 corresponds to a partial potential which is produced by dividing a potential difference between the third potential 833 and the fourth potential 815 using a series circuit consisting of the third resistor 814 and the fourth resistor 831, whereas the connection determination part 816 determines that a video-signal cable is not connected normally when the potential does not corresponds to the partial potential.

In this connection, the video device 81 may further include a third switch configured to close or open the connection between the first resistor 812 and the second potential 813, which is closed when the main power source of the video device 81 is turned on, or a fourth switch configured to close or open the connection between the third resistor 814 and the fourth potential 815, which is closed when the main power source of the video device 81 is turned on. By further including the third switch or the fourth switch, it is possible for another video device, i.e. the video device 82 or the video device 83, to detect that the main power source of the video device 81 is not turned on.

The present embodiment does not need to carry out a process to confirm the content of a communication between video devices, and therefore it is possible to determine the existence/nonexistence of an error connection of a video-signal cable with a simple configuration. According to the present embodiment, it is possible for a video device to determine an error connection when another video device is turned off in power.

The correlation between the configuration of FIG. 14 and the configuration of FIG. 3 can be described below. That is, the video display system 8 shown in FIG. 14 corresponds to the video display system 1 shown in FIG. 3. The video device 82 and the video device 81 shown in FIG. 14 correspond to the video device 101 and the video device 102 shown in FIG. 3. In this case, the video device 82 corresponds to the video device 101 while the video device 81 corresponds to the video device 102. In addition, the video device 81 and the video device 83 shown in FIG. 14 correspond to the video device 101 and the video device 102 shown in FIG. 3. In this case, the video device 81 corresponds to the video device 101 while the video device 83 corresponds to the video device 102.

The video-signal cable 84 and the video-signal cable 85 shown in FIG. 14 correspond to the video-signal cable 2 shown in FIG. 3. The first resistor 812 shown in FIG. 14 corresponds to the pullup resistor 41 of the video device 102 shown in FIG. 3. The second resistor 821 shown in FIG. 14 corresponds to the pulldown resistor 31 of the video device 101 shown in FIG. 3. The first switch 822 shown in FIG. 14 corresponds to the switch 32 of the video device 101 shown in FIG. 3. The third resistor 814 shown in FIG. 14 corresponds to the pulldown resistor 31 of the video device 101 shown in FIG. 3. The fourth resistor 831 shown in FIG. 14 corresponds to the pullup resistor 41 of the video device 102 shown in FIG. 3. The second switch 832 shown in FIG. 14 corresponds to the switch 42 of the video device 102 shown in FIG. 3.

The first potential 823, the second potential 813, the third potential 833, and the fourth potential 815 shown in FIG. 14 correspond to the ground potential (i.e. the pulldown potential), 3.3 V (i.e. the pullup potential), 3.3 V (i.e. the pullup potential), and the ground potential (i.e. the pulldown potential). In this connection, the first potential 823, the second potential 813, the third potential 833, and the fourth potential 815 are each set to the ground potential, the power-supply potential (or the power-source voltage), or other potentials. The connection determination part 816 shown in FIG. 14 corresponds to the connection determination part 11 of the video device 101 or the connection determination part 11 of the video device 102 shown in FIG. 3. The first signal line 841 shown in FIG. 14 corresponds to the signal line 43 of the video device 102 as well as a series connection of the signal line 43 of the video device 102, the signal line 201, and the signal line 33 of the video device 101 shown in FIG. 3. In addition, the second signal line 851 shown in FIG. 14 corresponds to the signal line 33 of the video device 101 as well as a series connection of the signal line 33 of the video device 101, the signal line 201, and the signal line 43 of the video device 102 shown in FIG. 3.

Heretofore, the present invention has been described in detail by way of the foregoing embodiment with reference to the drawings; however, the concrete configurations thereof are not necessarily limited to the foregoing embodiment; hence, the present invention may include any design changes without departing from the subject matter of the invention.

REFERENCE SIGNS LIST 1, 8 video display system
2, 84, 85 video-signal cable
30, 40 DP connector
31 pulldown resistor
32, 42 switch
33, 43, 201 signal line
41 pullup resistor
81, 82, 83, 100, 101, 102 video device
11, 816 connection determination part
812 first resistor
821 second resistor
814 third resistor
831 fourth resistor
841 first signal line
851 second signal line
822 first switch
832 second switch

The invention claimed is:

1. A video device comprising:
at least one of an input connector coupled with a video-signal cable configured to transmit a video signal and an output connector coupled with the video-signal cable, wherein a first resistor is provided in connection with the input connector while a third resistor is provided in connection with the output connector,
wherein when the input connector is provided and normally connected to other video device through the video-signal cable, a first signal line, corresponding to one of a plurality of signal lines connected to the input connector, is connected to a first potential via a second resistor and a first switch included in the other video device in which the first switch is closed upon turning on a main power source of the other video device, wherein the first signal line is further connected to a second potential different from the first potential via the first resistor, and
wherein when the output connector is provided and normally connected to the other video device through the video-signal cable, a second signal line, corresponding to one of a plurality of signal lines connected to the output connector, is connected to a third potential via a fourth resistor and a second switch included in the other video device in which the second switch is closed upon turning on the main power source of the other video device, wherein the second signal line is further connected to a fourth potential different from the third potential via the third resistor; and
a connection determination part configured to determine whether or not the video-signal cable is connected normally based on a potential of the first signal line or a potential of the second signal line.

2. The video device according to claim 1, wherein the connection determination part is configured to determine a normal connection of the video-signal cable when the potential of the first signal line corresponds to a partial potential which is produced by dividing a potential difference between the first potential and the second potential by a series circuit consisting of the first resistor and the second resistor or when the potential of the second signal line corresponds to a partial potential which is produced by dividing a potential difference between the third potential and the fourth potential by a series circuit consisting of the third resistor and the fourth resistor, and wherein the connection determination part is configured not to determine the normal connection of the video-signal cable without conformity with the partial potential.

3. The video device according to claim 1, further comprising a third switch configured to close or open a connection between the first resistor and the second potential wherein the third switch is closed upon turning on a main power source of the video device, or a fourth switch configured to close or open an connection between the third resistor and the fourth potential wherein the fourth switch is closed upon turning on the main power source of the video device.

4. The video device according to claim 1, wherein the input connector and the output connector are each configured of a DP connector.

5. A video device comprising at least one of an input connector and an output connector connectible to a video-signal cable, further comprising:
at least one of a first switch and a second switch which are each closed upon turning on a main power source of the video device;
at least one of a first signal line which is connected to the input connector and which is connected to a first resistor joining the first switch coupled with a first-potential signal line and a second signal line which is connected to the output connector and which is connected to a second resistor joining the second switch coupled with a second-potential signal line; and
a connection determination part configured to determine whether or not the video-signal cable is normally connected to the input connector based on a potential of the first signal line and/or configured to determine whether or not the video-signal cable is normally connected to the output connector based on a potential of the second signal line.

6. The video device according to claim 5, wherein the connection determination part is further configured to determine that the video-signal cable is normally connected to the input connector when the potential of the first signal line is equal to a predetermined potential, and wherein the connection determination part is further configured to determine that the video-signal cable is normally connected to the output connector when the potential of the second signal line is equal to the predetermined potential.

7. The video device according to claim 6, wherein the predetermined potential is lower than the first potential but higher than the second potential.

8. The video device according to claim 5, wherein a resistance of the first resistor is larger than a resistance of the second resistor.

9. The video device according to claim 5, wherein the first resistor comprises a pullup resistor while the second resistor comprises a pulldown resistor.

10. The video device according to claim 5, wherein the connection determination part is further configured to display a predetermined image on a display part of the video device upon determining that the video-signal cable is not normally connected to the input connector and/or the output connector.

11. A connection determination method for a video device comprising an input connector and an output connector connectible to a video-signal cable, comprising:
    closing a first switch, which is connected to a first signal line coupled with a first terminal of the input connector via a first resistor and further connected to a first-potential signal line, upon turning on a main power source of the video device;
    closing a second switch, which is connected to a second signal line coupled with a second terminal of the output connector via a second resistor and further connected to a second-potential signal line, upon turning on the main power source of the video device;
    determining whether or not the video-signal cable is normally connected to the input connector based on a potential of the first signal line; and
    determining whether or not the video-signal cable is normally connected to the output connector based on a potential of the second signal line.

12. The video device according to claim 11, wherein a signal type allocated to the first terminal is identical to a signal type allocated to the second terminal.

13. A video device comprising an input connector and an output connector each connectible to a video-signal cable,
    wherein the input connector is connected to a first resistor coupled with a predetermined potential and oppositely connected to a first signal line of the video-signal cable while the output connector is connected to a second resistor coupled with a ground potential and oppositely connected to a second signal line of the video-signal cable, and
    wherein the video-signal cable connected to the output connector is connected to a third video device in which the second signal line is connected to a third resistor and a first switch coupled with another predetermined potential, and wherein the first switch is closed when power is applied to the third video device.

14. The video device according to claim 13, wherein the video-signal cable connected to the input connector is connected to a second video device in which the first signal line is connected to a second resistor and a second switch coupled with another ground potential, and wherein the second switch is closed when power is applied to the second video device.

15. The video device according to 14, wherein the first resistor is configured of a pull-up resistor while the second resistor is configured of a pull-down resistor.

* * * * *